(12) United States Patent
Glover et al.

(10) Patent No.: US 7,950,192 B2
(45) Date of Patent: May 31, 2011

(54) FRAMED PANEL AND RELATED METHOD OF MANUFACTURE

(75) Inventors: Michael Glover, Ottawa (CA); Stephen Field, Ottawa (CA)

(73) Assignee: Bystronic Maschinen AG, Butzberg (CH)

( * ) Notice: Subject to any disclaimer, the term of this patent is extended or adjusted under 35 U.S.C. 154(b) by 1295 days.

(21) Appl. No.: 10/578,198

(22) PCT Filed: Nov. 4, 2004

(86) PCT No.: PCT/CA2004/001935
§ 371 (c)(1),
(2), (4) Date: May 4, 2006

(87) PCT Pub. No.: WO2005/042901
PCT Pub. Date: May 12, 2005

(65) Prior Publication Data
US 2007/0032972 A1 Feb. 8, 2007

Related U.S. Application Data

(60) Provisional application No. 60/516,874, filed on Nov. 4, 2003.

(51) Int. Cl.
*E06B 7/16* (2006.01)
(52) U.S. Cl. ............. 52/204.593; 52/204.53; 52/204.54; 52/204.6; 52/204.62; 52/204.64; 52/204.71; 52/207.7
(58) Field of Classification Search ................ 52/204.1, 52/210–213, 216, 204.5, 204.53, 204.54, 52/204.591, 204.593, 204.595, 204.597, 52/204.6, 204.62, 204.71, 204.69, 204.68, 52/204.67
See application file for complete search history.

(56) References Cited

U.S. PATENT DOCUMENTS

| | | | | |
|---|---|---|---|---|
| 2,934,801 A | * | 5/1960 | Blaszkowski | ............ 52/204.595 |
| 3,429,602 A | | 2/1969 | Necdet | |
| 3,438,166 A | * | 4/1969 | Bakke | ...................... 52/204.597 |

(Continued)

FOREIGN PATENT DOCUMENTS

CA 2 439 552 12/2002

(Continued)

OTHER PUBLICATIONS

International Search Report issued Oct. 2, 2002 in the International (PCT) Application PCT/CA02/00842 of which the U.S. Patent 7,122,088 (cited herein) is the U.S. National Stage.

(Continued)

*Primary Examiner* — Jeanette E. Chapman
(74) *Attorney, Agent, or Firm* — Wenderoth, Lind & Ponack, L.L.P.

(57) ABSTRACT

A framed panel and related method of manufacture are disclosed. A framed panel unit includes a panel along the edge of which thermoplastic frame members are disposed. The frame members have first and second opposed side walls which define a channel for receiving the edge of the panel. The channel of each frame member has spacers between the panel and each side wall for spacing the panel from the side walls. Prior to welding together the ends of the frame members, the spacers retain the frame members on the panel. The panel may include multiple opposed sheet members with a spacer between the sheet members spacing them apart, and a reactive thermoplastic sealant material bonding the sheets to the frame members. An associated method of forming a named panel, frame members for a panel, and a spacer component for use in mounting a panel within a channel of a frame member are also disclosed.

14 Claims, 20 Drawing Sheets

U.S. PATENT DOCUMENTS

| | | | | |
|---|---|---|---|---|
| 3,992,843 | A | * | 11/1976 | DiFazio .................. 52/204.593 |
| 4,004,389 | A | * | 1/1977 | DiFazio .................. 52/204.593 |
| 4,015,394 | A | * | 4/1977 | Kessler ...................... 52/786.1 |
| 4,055,031 | A | * | 10/1977 | Okawa et al. .................. 52/172 |
| 4,074,480 | A | | 2/1978 | Burton |
| 4,090,799 | A | | 5/1978 | Crotti et al. |
| 4,295,305 | A | * | 10/1981 | Shelver ........................... 52/172 |
| 4,390,578 | A | | 6/1983 | Brooks |
| 4,689,933 | A | * | 9/1987 | Biro ............................ 52/656.5 |
| 4,984,402 | A | * | 1/1991 | Davies .................... 52/204.593 |
| 5,339,926 | A | | 8/1994 | McCanse et al. |
| 5,622,017 | A | | 4/1997 | Lynn et al. |
| 5,902,657 | A | | 5/1999 | Hanson et al. |
| 5,983,593 | A | * | 11/1999 | Carbary et al. ............ 52/786.11 |
| 6,103,035 | A | | 8/2000 | Hanson et al. |
| 6,286,288 | B1 | | 9/2001 | France |
| 6,604,668 | B2 | | 8/2003 | Crasser |
| 6,673,175 | B2 | | 1/2004 | Brooks |
| 7,122,088 | B2 | | 10/2006 | Field et al. |
| 2004/0108040 | A1 | * | 6/2004 | Field et al. .................. 156/73.6 |
| 2006/0260760 | A1 | | 11/2006 | Field et al. |
| 2006/0283554 | A1 | | 12/2006 | Field et al. |

FOREIGN PATENT DOCUMENTS

| | | |
|---|---|---|
| DE | 198 09 956 | 9/1999 |
| DE | 199 38 099 | 2/2001 |
| EP | 1 288 426 | 3/2003 |
| FR | 1 371 737 | 9/1964 |
| FR | 2 425 608 | 12/1979 |
| GB | 2 033 394 | 5/1980 |
| RU | 2 183 160 | 8/1999 |
| WO | 01/12420 | 2/2001 |

OTHER PUBLICATIONS

International Search Report issued Mar. 8, 2005 in the International (PCT) Application of which the present application is the U.S. National Stage.

* cited by examiner

US 7,950,192 B2

FRAMED PANEL AND RELATED METHOD OF MANUFACTURE

This application claims the benefit of and is a National Phase Entry of International Application Serial Number PCT/CA2004/001935, filed Nov. 4, 2004. This application also claims the benefit of U.S. Provisional Patent Application 60/516,874, filed on Nov. 4, 2003, from which PCT/CA2004/001935 claims priority.

The International Application PCT/CA2004/001935 and U.S. Provisional Application 60/516,874 are hereby incorporated herein by reference.

FIELD OF THE INVENTION

This invention relates generally to framed panels and fenestration products and more particularly but not limited to products made from thermoplastic profiles welded around an insulating glass unit.

BACKGROUND OF THE INVENTION

To improve manufacturing efficiency and reduce product costs, various attempts have been make in recent years to develop integrated insulating glass/window frame production systems.

One example which is described in a presentation given at InterGlass Metal 97' was developed in Germany by Meeth Fenester. With this production system, the window is, fabricated from plastic channel window frame profiles that are assembled around an insulating glass (IG) unit and corner welded using conventional hot plate technology. During the assembly process, the unit is held in position by means of a hot melt butyl adhesive bead that is located centrally in the frame channel. Twin silicone thermosetting glazing sealant beads are then applied in the two gaps either side of the IG unit. After assembly, the windows are stored in a truck container ready for shipping and the truck containers are left-parked outside the factory for a few hours while the two-part silicone sealant is cured. For the Meeth production system, there are four main drawbacks. First, because of the butyl adhesive bead, the glazing channel cannot be drained and this creates potential IG durability problems. Second, conventional hot plate welding is a slow process that is complicated by the need for corner flash removal. Third, the sash frame assemblies cannot be shipped until the two-part thermosetting sealant is fully cured. Fourth, the Meeth production is largely a manual process with manual loading of the individual frame profiles into the welding clamping fixtures and manual application of the sealant beads.

A second example of an integrated IG/window frame system is described in U.S. Pat. No. 5,622,017 issued to Lynn et al. and assigned to the Andersen Corporation. As with the Meeth system, the Andersen window is also fabricated from plastic channel frame profiles that are assembled around an IG unit and corner welded using conventional hot plate technology. In comparison with the Meeth System, the Andersen profile incorporates conventional plastic glazing fins on one side of the channel frame profile. A structural thermosetting sealant is then applied to one side of the unit and the single glazing sealant bead is allowed to cure. Because the IG glass unit is not held in position, the frame subassembly cannot be moved for several hours while waiting for the sealant to cure. In addition, the unit cannot be accurately centered within the channel profile and so the process of sealant application cannot be easily automated.

As described in U.S. Pat. No. 5,902,657 issued to Hanson et al., the channel frame profiles can be joined at the corners using friction welding with a moveable U-shaped metal platen that rapidly moves back and forth melting the plastic at the interface joint. As with conventional hot plate welding, the metal platen is then removed and the matching ends of the framing profiles are then pressured against each other. From a practical perspective, this solution is difficult to implement because as the metal plate is removed, the molten plastic material is also removed resulting in a poor weld assembly. A further concern is that the IG unit is held in position by the sloped channel walls and as a result there are potential glass breakage problems at the corners.

A third example of an integrated IG/window frame system is described in PCT application CA02/000842 by Field et al (See FIGS. 21-23 therein). Again, the frame assembly is welded using friction welding but instead of using a metal platen, a plastic web is used that is vibrated back and forth using an inverted vibratory welding head. To avoid potential glass breakage problems, the IG unit is isolated from the plastic channel frame profiles using conventional rubber setting blocks. However, because the unit is not firmly held in position and is not accurately centered, the sealant application process cannot easily be automated. In addition, the profiles have to be manually loaded into the clamping fixtures and this slows down the production cycle time.

SUMMARY OF THE INVENTION

According to one aspect of the present invention, there is provided a framed panel unit comprising a panel; a plurality of thermoplastic frame members disposed along the edge of said panel; each frame member having first and second opposed side walls defining a channel therebetween, the edge of said panel being received within the channel of each frame member; the channel of each frame member having spacer means therein including a first spacer between said panel and said first side wall for spacing said panel from said first side wall and a second spacer between said panel and said second side wall for spacing said panel from said second side wall, and where prior to welding together the ends of said frame profiles, the spacer means retain frame members on the panel.

One preferred arrangement is where at least one of said first and second spacers is positioned below the top of a respective channel wall to provide an open gap at the top of the channel between the panel and the side wall for receiving sealant. Advantageously, in this arrangement, spacers are provided in the channel, either side of the panel to center the panel in the channel and to also hold the panel in position during an assembly process, for example during application of a sealant, e.g. a reactive thermoplastic sealant, to both sides of the panel along a frame member.

In this arrangement, the spacers also resiliently retain the frame members on the panel when the frame members are unconnected so that the frame members can be positioned and held in place on the panel before the frame members are connected together, for example by welding. This also facilitates handling of the unit by allowing the various components to be moved and transferred together as whole between assembly stations in a production process and, in particular, facilitates the transfer and loading of the frame members into a welding apparatus so that this loading process may be automated, rather than manual.

One or both spacers may be formed separately from the frame member, or may be formed integrally therewith. One or both spacers may comprise a discrete protrusion extending into the channel for engaging a portion of the panel adjacent an edge thereof. Either one or each protrusion may have an upper surface which is deflected downwards to engage the surface of the panel so that when the pressure applied to the panel by the protrusion is increased if the frame member is pulled in a direction away from the panel, making it difficult to withdraw the frame member from the panel when installed thereon.

When separately formed from the frame members, the first and second spacer may be joined together by a third intermediate spacer which spaces the edge of the panel from the base of the channel. The first, second and third spacers may thereby form a U-shaped insert and the first and second spacers may be hingedly coupled to the third spacer and may be integrally formed therewith. The spacer insert may include locator means for positioning the insert at a predetermined lateral position between the side walls of the channel, which is particularly advantageous when, due to manufacturing tolerances, the distance between the side walls of the channel are greater than required to accommodate the width of the insert. In one embodiment, the base of the channel has oppositely sloped upper surfaces which slope transversely of the channel and the locator means includes first and second oppositely sloped lower surfaces of the third spacer which engage the sloped surfaces of the channel to urge the third spacer towards a predetermined position within the channel on applying a force, for example the weight of the panel, to the third spacer towards the base of the channel.

In one embodiment, the frame members are welded together by friction welding, and preferably by means of a weldable junction piece disposed between adjacent ends of the frame members. The junction piece may be a flat planar flange or may also incorporate integral legs that help position the framing members in the assembly process. In one embodiment, the framed panel unit includes a reactive thermoplastic sealant material along the junction between one or both outer surfaces of the panel and the frame member. The sealant material may have a high degree of stiffness (high modulus) to increase the structural strength and rigidity of the framed panel unit. The reactive thermoplastic sealant may for example be polyurethane or silicone based.

Advantageously, as the spacers effectively position and hold the panel in the desired position, relative thereto, the sealant need not have any open time to allow the panel to be repositioned relative to the joined frame members, and no repositioning is required. This allows a warm or hot applied thermoplastic sealant to be used which cools down almost immediately on its application to the panel unit so that once the application process is complete, the unit can be moved almost immediately to the next production stage, if any, for shipment, or for storage, resulting in a fast and more efficient production process. In one embodiment, the sealant may comprise a reactive thermoplastic sealant that may have an open time of 2 seconds or less but which after exposure to moisture chemically cures and bonds to the glass.

According to another aspect of the present invention, there is provided a panel unit comprising first and second opposed sheet members; a spacer between said sheet members spacing said sheet members apart, said spacer comprising a thermoplastic sealant material and being located proximate an edge of the sheet members; a frame member having a channel formed therein, said edge being disposed within said channel; and a reactive thermoplastic sealant material bonding said sheets to said frame member.

Advantageously, the provision of a reactive thermoplastic sealant material which structurally bonds the sheets to the frame member allows the perimeter seal and spacer between the sheet members to be simplified and the material used to be considerably reduced. In one embodiment, the perimeter edge seal between the glazing sheets only consists of a thermoplastic sealant spacer.

According to another aspect of the present invention, there is provided a method of forming a framed panel, comprising the steps of: (a) providing a panel to be framed; (b) providing a plurality of frame members for framing said panel, each frame member having a channel formed therein for receiving an edge portion of said panel and resilient means within said channel for spacing the panel from opposed side walls of said channel and for resiliently retaining said panel in said channel; (c) inserting said panel into the channel of each frame member such that said frame members are held on said panel by said resilient means; and (d) joining the ends of adjacent frame members together by welding. In one embodiment, the framing members are interconnected by junction pieces prior to transferring the frame/panel subassembly to the welding apparatus.

According to another aspect of the present invention, there is provided a frame member for a panel, comprising first and second opposed side walls defining a channel therebetween for receiving said panel; first and second pre-formed spacers comprising a resilient material inserted in said channel; the first spacer being positioned against said first side wall for spacing one side of said panel therefrom and said second spacer being positioned against said second side wall to space the other side of said panel therefrom.

According to another aspect of the present invention, there is provided a spacer component for use in mounting a panel within a channel of a frame member, comprising a base portion for spacing said panel from the base of said channel; a side portion extending from said base portion for spacing said panel from a side wall of said channel; and a protrusion extending from said side portion for engaging a face of said panel and for resiliently retaining said panel in said frame member.

According to another aspect of the present invention, there is provided a frame member comprising first and second opposed sidewalls defining a channel therebetween and protrusions extending from each sidewall into said channel for resiliently retaining a panel therebetween. In one embodiment, the protrusions that extend from each side wall are flexible fins and according to another embodiment, a bulb seal also extends from each side wall and is located at the top of each framing channel member.

According to another aspect of the present invention, there is provided a frame member comprising first and second opposed sidewalls defining a channel therebetween, at least one sidewall having an elongate recess formed therein extending along the channel and positioned below the top of a respective sidewall.

BRIEF DESCRIPTION OF THE DRAWINGS

FIG. 10A shows a schematic plan view of the insulating glass panel.

FIG. 10B shows a schematic plan view of the insulating glass panel with U-shaped plastic framing profiles loosely assembled around the insulating unit.

FIG. 10C shows a plan view of the insulating panel/plastic sash frame subassembly with junction pieces inserted at the corners.

FIG. 10D shows a plan view of the completed window sash subassembly.

FIG. 12A shows a plan view of the frame profiles assembled around an insulating glass panel.

FIG. 12B shows a plan view of the insulating glass panel/frame subassembly.

FIG. 12C shows a plan view of the insulating glass panel/frame subassembly suspended below a gantry.

FIG. 12D shows a plan view of a four headed horizontal friction corner welder with the insulating glass panel/frame assembly dropped into position.

FIG. 12E shows a plan view of the four headed horizontal friction corner welder with the insulating glass panel/frame assembly clamped into position just prior to the welding process.

DETAILED DESCRIPTION OF THE PREFERRED EMBODIMENTS

Figure 1:
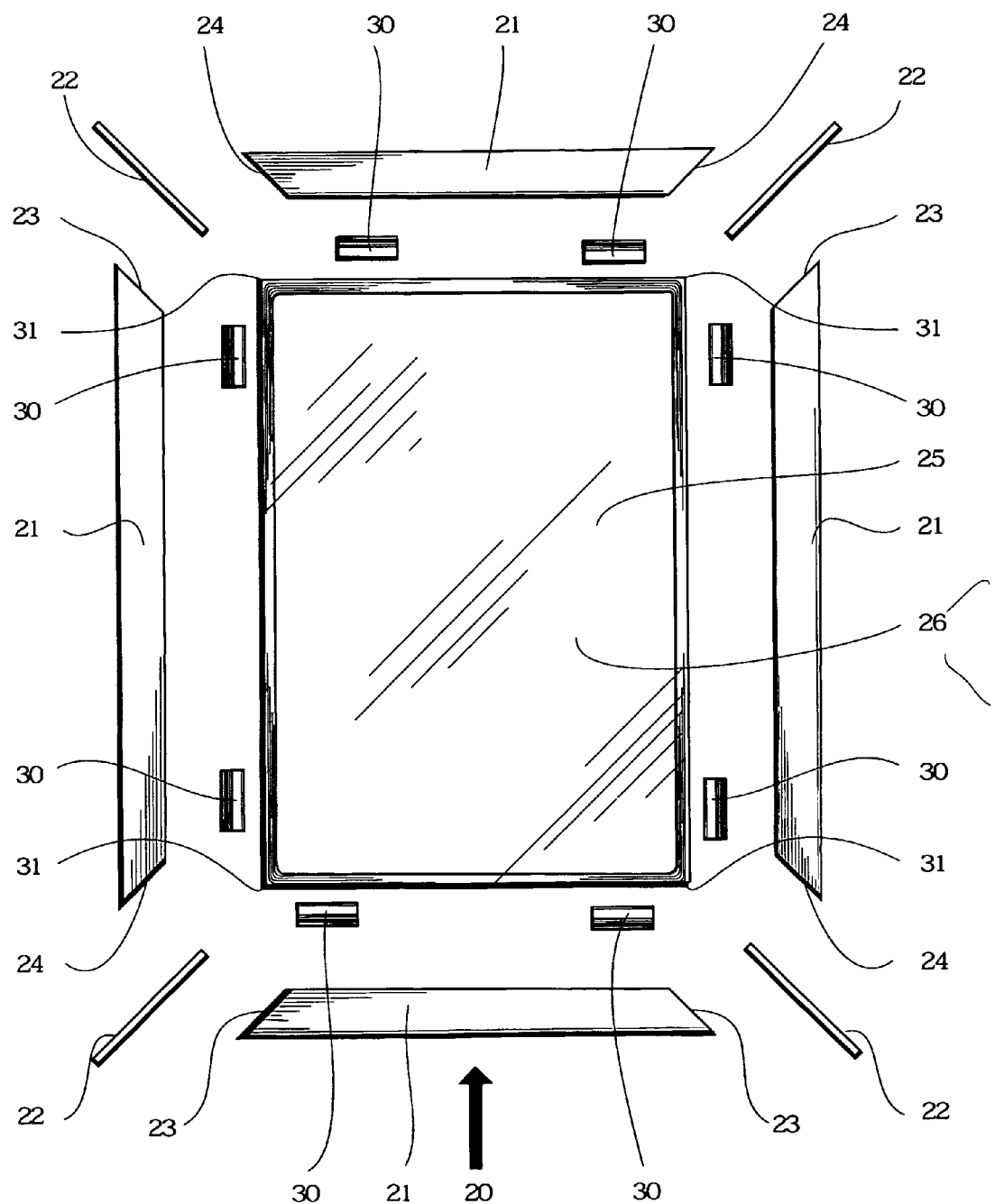
FIG. 1 shows an exploded elevation view of U-channel sash frame profiles assembled around an insulating glass panel.

Referring to the drawings, FIG. 1 shows an exploded elevation view of a sash window 20 where the U-shaped thermoplastic framing profiles 21 are assembled around an insulating glass panel unit 25. Typically, the insulating glass panel unit 25 consists of two glass sheets 26,27, which are shown more clearly in FIG. 5, and are separated by a perimeter edge seal. As described in more detail in FIGS. 3 to 5, the end joint surfaces 23,24 of the sash frame profile members 21 are friction welded at the corners using thermoplastic planar flange junction pieces 22. Folding rubber spacer inserts 30 are used to hold the insulating glass panel 25 in position within the U-shaped channel profile 21. Prior to the welding process, the folding rubber spacer inserts 30 also retain the framing profiles 21 in position on the insulating glass panel 25. In addition, the folding rubber spacer inserts 30 also prevent the vibrating junction piece 22 from striking the corners 31 of the insulating glass panel 25 during the welding process. The folding rubber spacer inserts 30 can be made from various resilient materials with one preferred material being EPDM rubber.

Figure 2:
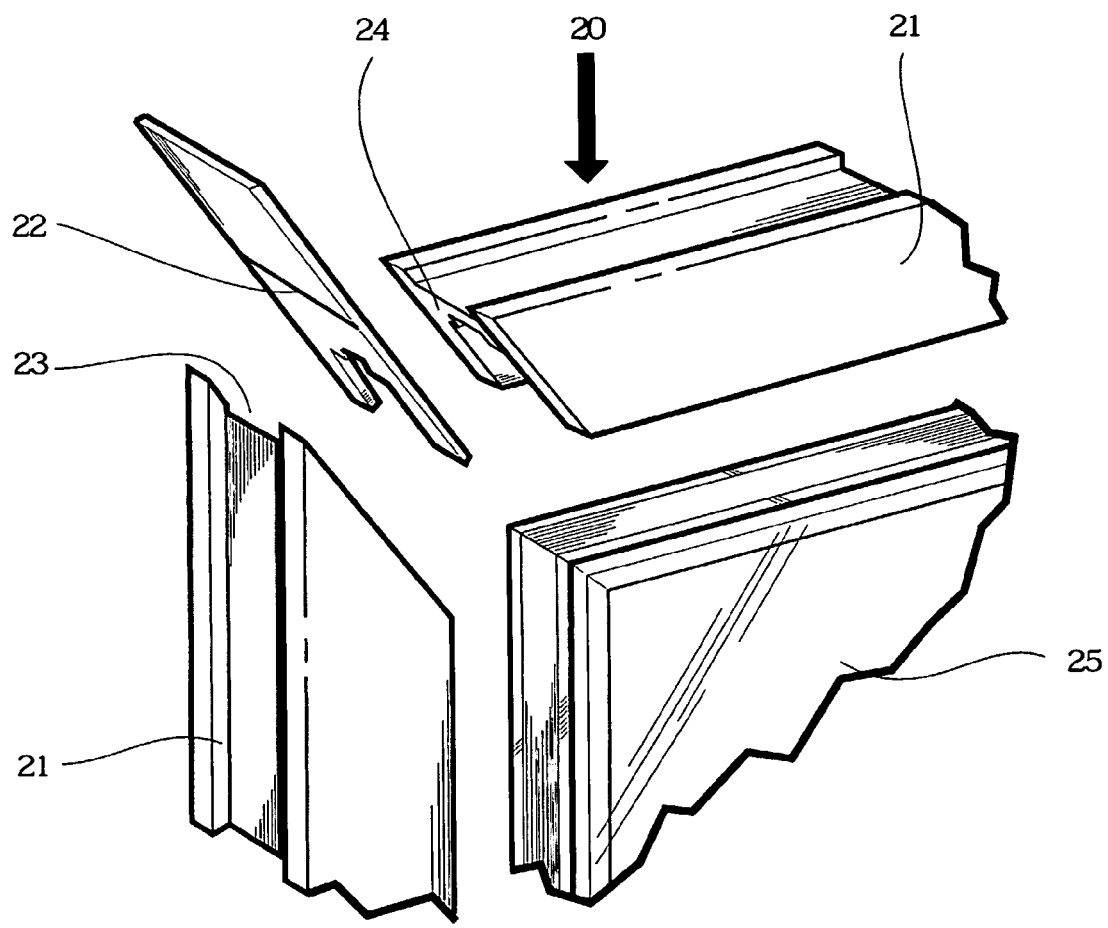
FIG. 2 is a vertical cross section perspective corner detail of a U-channel sash frame incorporating a double glazed insulating panel.

FIG. 2 shows an exploded perspective corner detail of a U-channel sash frame window 20 incorporating a double glazed insulating panel unit 25. The ends 23,24 of the plastic framing profiles 21 are miter cut and vibration welded to a plastic planar flange junction piece 22. The framing profiles 21 can be made from various thermoplastic materials but generally, the preferred material is polyvinyl chloride (PVC). In order for the junction pieces 22 to strongly bond to the framing profiles 21, the junction pieces 22 are made from essentially the same type of plastic material as the framing profiles 21.

Figure 3:
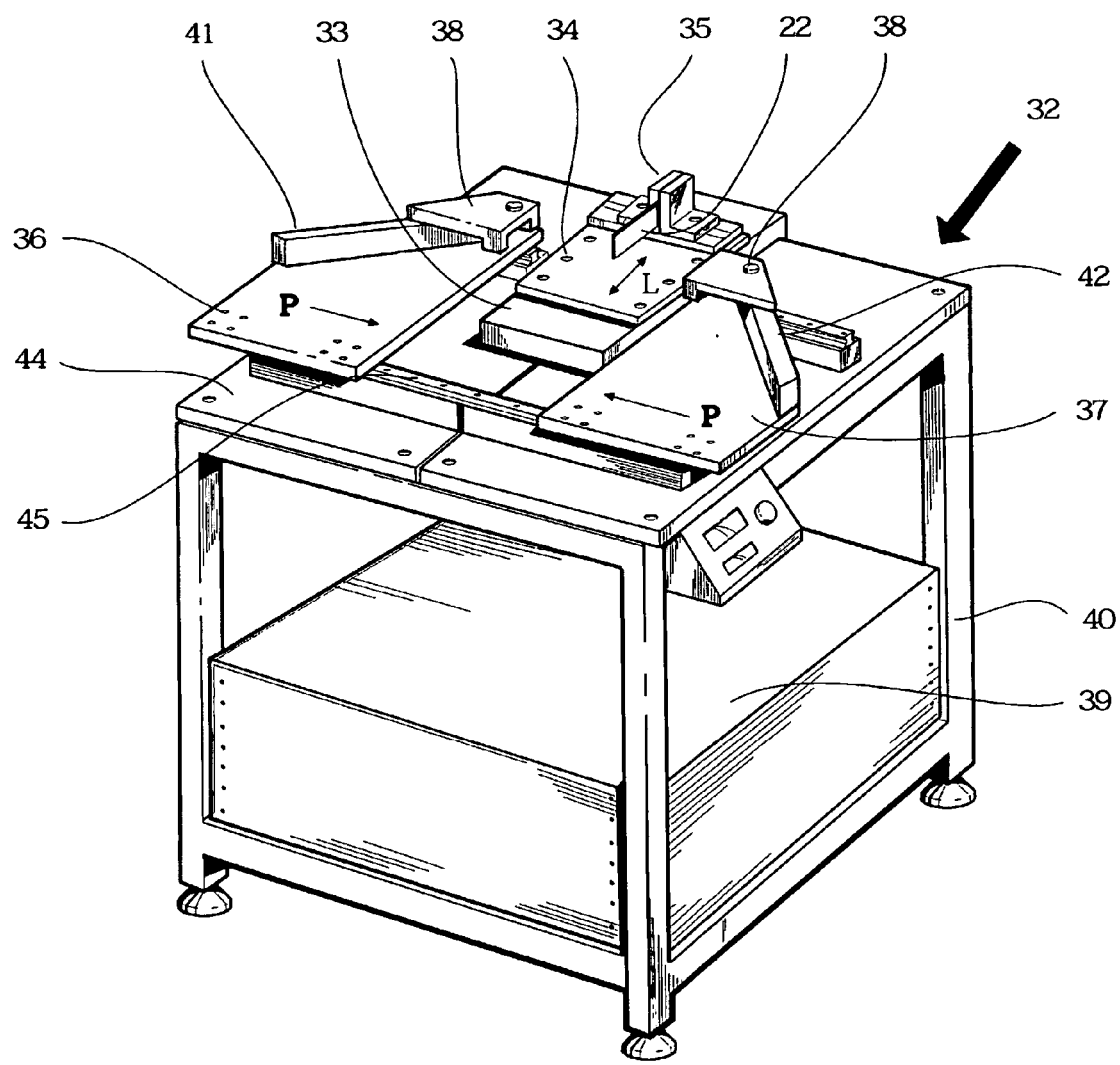
FIG. 3 is a perspective view of a single corner vibration welding apparatus.

FIG. 3 shows a top perspective view of a prototype single corner vibration welding apparatus 32. The apparatus consists of five main components:

1. Vibratory Head

A linear vibratory head 33 that incorporates a top plate 34 which vibrates back and forth very rapidly in a predetermined plane.

2. Junction Piece Holding Fixture

A junction piece holding fixture 35 which is directly attached to the top plate 34 and firmly holds the planar flange junction piece 22 in position.

3. Moveable Framing Fixtures

Two moveable framing fixtures 36 and 37 incorporate clamping devices 38 that firmly hold the framing profiles 21 in position.

4. Control Systems

A control system 39 that regulates the various operating parameters of the vibration welding apparatus 32 including: weld time, hold time, joint pressure, weld depth, amplitude, frequency and voltage.

5. Machine Frame

A machine frame 40 which provides the structure that supports the other components.

Figure 4A:
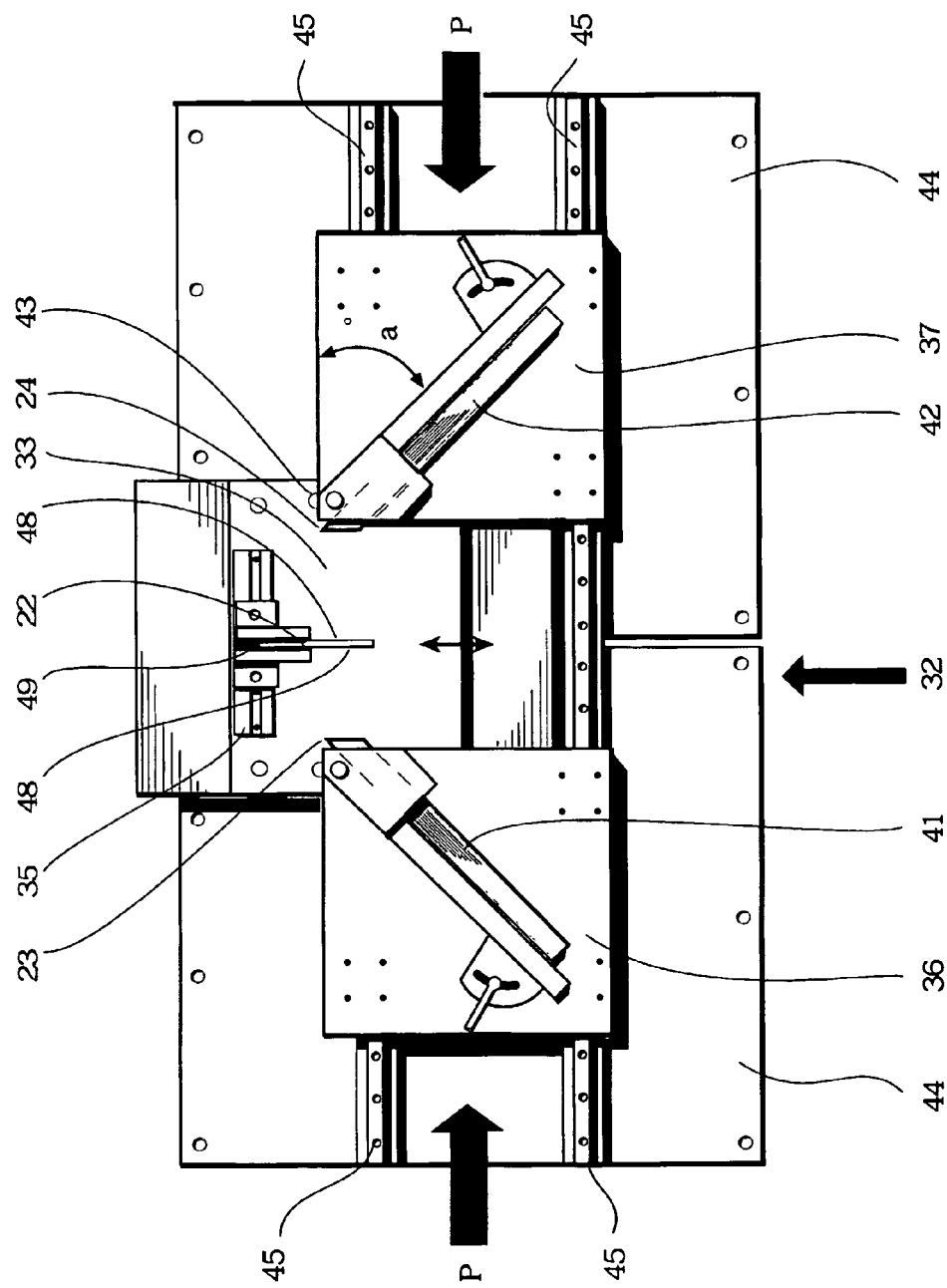
FIG. 4A is a plan view of a single corner, vibration welding apparatus with the extrusions installed in the fixtures prior to the welding process.

FIG. 4A shows a plan view of a single corner, vibration welding apparatus 32 in an open position. The linear vibration welding apparatus 32 features a vibratory head 33 that linearly moves back and forth in a pre-determined plane. The vibratory head 33 is similar to the vibratory heads used on commercially available linear vibration welders such as the Branson Mini Welder, but unlike these commercially available products, the vibratory head is turned upside down as this allows for more flexible and easy positioning of the framing profile members 41 and 42 during the frame assembly process. A flat plate 43 is bolted to the top surface of the vibratory head 33. As with standard vibration welders, the vibratory head 33 is bolted to a separate heavy cast iron support (not shown) and isolated from the cast iron support structure (not shown) using rubber mounts. This cast iron support structure is in turn bolted to a machine frame 40 that positions the vibratory head 33 at a convenient working height.

Flat plate metal sheets 44 are bolted to the top surface of the machine frame 40 but this top working surface is separated apart from the vibratory head 33 so that a minimum of vibratory movement is transferred to the machine frame 40. Moveable profile fixtures 36 and 37 are supported on guide rails 45 directly attached to the top table plate 44 and these fixtures hold the framing profiles 41 and 42 in position. The moveable profile fixtures 36 and 37 move over the vibratory head 33 but there is no direct contact except where the framing profiles 41 and 42 contact the junction piece 22. The moveable fixtures also allow for the miter cut ends 23, 24 of the framing profiles 41 and 42 to be positioned parallel to the planar flange 48 of the junction piece 22.

A fixed holding fixture 35 for the junction piece 22 is located so that the planar flange 48 of the junction piece 22 is in a balanced central position. The holding fixture 35 which is directly attached to the top plate 43 of the vibratory head 33, firmly holds the removable tab 49 of the junction piece 22 in position.

Figure 4B:
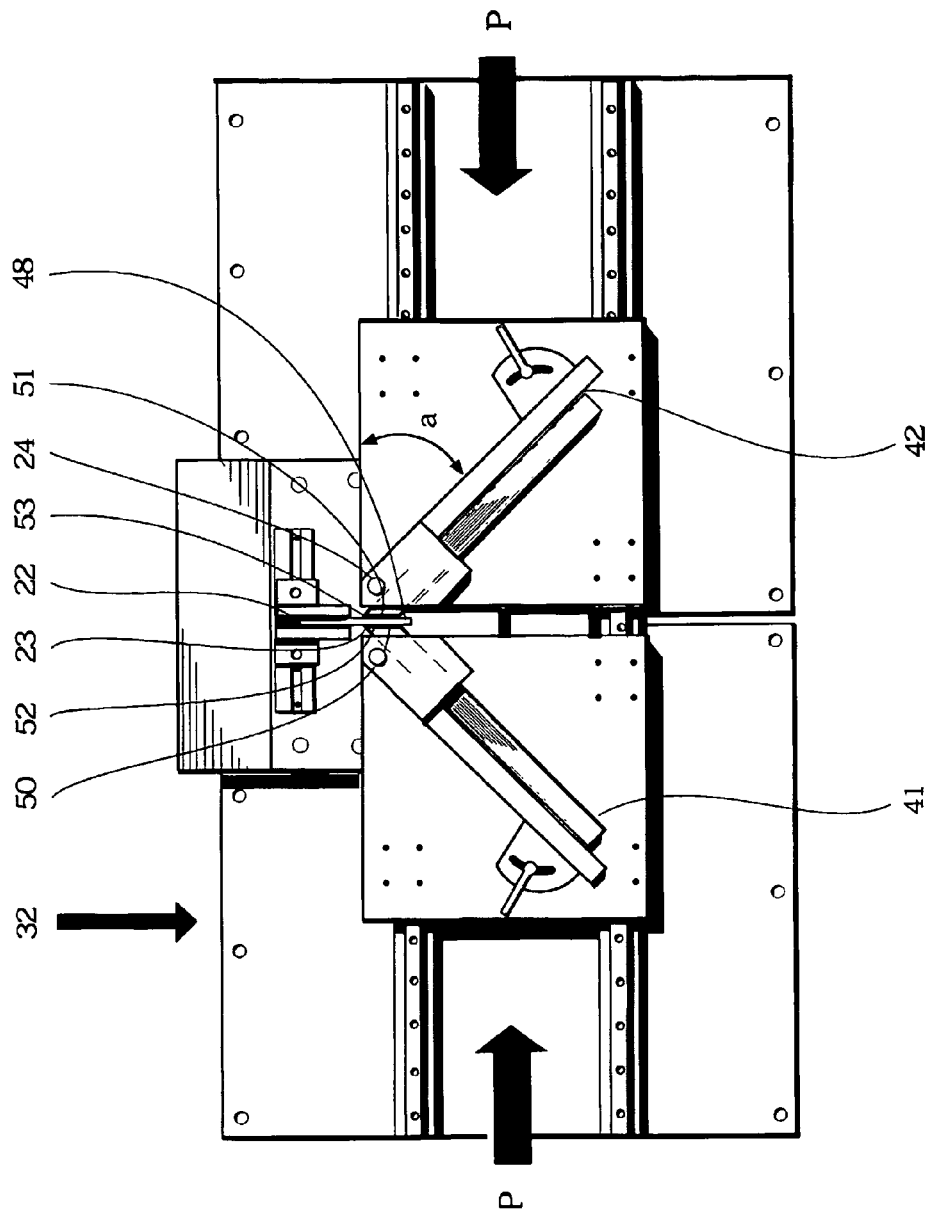
FIG. 4B is a view similar to FIG. 4A showing the single corner vibration welding apparatus during the welding process.

FIG. 4B shows a plan view of the vibration welding equipment 32 in operation with the miter cut ends 23 and 24 of the framing profiles 41 and 42 being pressured against the planar flange 48 of the junction piece 22. By vibrating the junction piece 22 back and forth and by simultaneously pressuring the framing profiles 41 and 42 against the planar flange 48 of the junction piece 22, friction heat is generated at the two joint interfaces 50 and 51. When a molten state is reached at the two joint interfaces 50 and 51, the vibration is stopped and the perpendicular pressure is then maintained briefly while the molten plastic solidifies to form two welded joints 52 and 53 on either side of the planar flange 48. In order to provide for even weld strength, essentially the same perpendicular engagement force has to be simultaneously applied to each side of the junction piece 22.

One of the key advantages of vibration corner welding is that by incorporating flash traps or weld beads within the junction piece 22, it is feasible to eliminate the need for mechanical flash removal and as a result, there are substantial equipment cost savings.

Although frame assemblies can be manufactured using a single corner welder, it is more productive if two or more corners are welded simultaneously. The operation of a vertical four head welder is described in PCT Application CA02/00842 by Field et al. As with conventional hot plate welders, the profiles are separately loaded into the holding fixtures and the miter cut corners are welded in either a one stage or two stage operation.

With a two stage process, two diagonally opposite corners and are first welded together. For each corner weld, the process is essentially the same as with a single corner vibration welder. Both sets of framing profiles are independently pressurized against the two diagonally opposite junction pieces. The next step is for the other set of diagonally opposite corners to be welded together and the assembled frame is then unloaded.

Because the friction welding process is so fast (3 to 6 seconds), this two stage process does not significantly increase cycle time and compared with simultaneously welding all four corners, the key advantage is that the required movement and control of the heads is greatly simplified.

For a conventional four head, hot plate welder, the overall cycle time is about 2 minutes and this overall cycle time includes: profile loading, corner welding, cool down and frame unloading. In comparison, the overall cycle time for the two-stage vibration welding process is less than 30 seconds and so this represents a significant increase in productivity.

Instead of a two stage process, a second option is to simultaneously weld all four corners in one operation. During the vibration welding process, each head has to move fractionally and because the head movements involved are so small and so complex, the control system for this simultaneous four headed welding operation is very complex and requires very sophisticated software.

A further major advantage of vibration corner welding is that it is feasible to weld around an insulating glass unit. With a four headed welder, the frame profiles are loaded into the framing fixtures and the insulating glass unit is positioned between the four welding heads. The four heads then move centrally into position so that the U-shaped framing profiles overlap the perimeter edge of the insulating glass unit. With the insulating glass unit in position, the miter cut frame profiles are then welded using friction corner welding.

Figure 5:
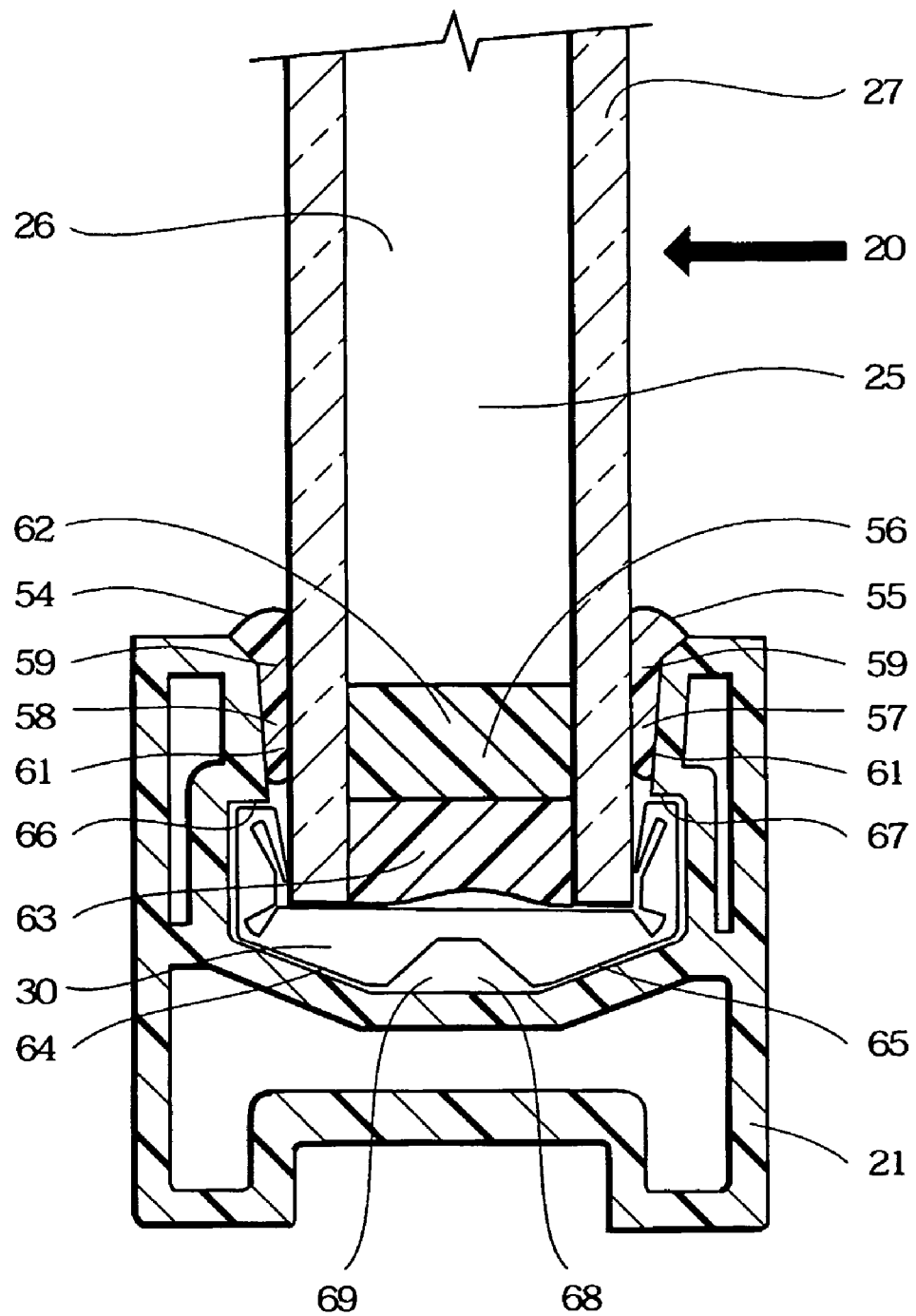
FIG. 5 shows a cross section sash frame detail of a U-channel sash frame profile incorporating a conventional dual-seal insulating glass panel and where the framing profiles are temporarily held in position by means of folding rubber spacer inserts.

FIG. 5 shows a bottom cross section detail of a U-channel sash window 20. The U-shaped channel sash framing profiles 21 are assembled around a dual seal insulating glass panel unit 25. The two gaps 57 and 58 between the insulating glass panel unit 25 and the framing profile 21 are filled with glazing sealant material 59 forming glazing beads 54 and 55. Various glazing sealant materials can be used but one preferred material is a reactive thermoplastic sealant.

Compared to conventional two-part thermosetting sealants, the advantage of a reactive thermoplastic sealant is that the one part sealant is warm or hot applied so that after a few seconds cool down, the material develops high green strength allowing the window units to be almost immediately handled. Compared to conventional widow glazing seal application where there is a need for some open time during the application process, the open time for the reactive thermoplastic sealant materials can be less than two seconds. In addition through a moisture cure process, the reactive thermoplastic material is chemically cured creating a strong adhesive bond between the glass sheets and the framing profiles.

Various types of reactive thermoplastic sealants can be used but one preferred material is a reactive hot melt polyurethane adhesive that is manufactured by National Starch and Chemical Company under the trade name of Purfect Glaze. A second preferred material is a reactive hot melt silicone that is manufactured by Dow Corning under the trade name of Instant Glaze. Compared to the reactive silicone material, the reactive polyurethane material generally provides for higher adhesion strength.

The modulus or stiffness of the Purfect Glaze sealant can be varied and generally, a high modulus material is preferred as this allows for the glass sheets to be firmly bonded to the framing profiles. As a result, structural advantage can be taken of the stiffness of the glass sheets 26,27 so that the structural performance of the framing profiles 21 is enhanced allowing for a reduction in profile size as well as the possible elimination of metal reinforcement that is typically required for large size PVC windows.

With a high modulus, stiff sealant material and because of the high differential expansion between the plastic PVC framing profiles 21 and the glass sheets, 26,27 there is potential for cold temperature glass breakage. However, our experience has shown that even at quite extreme Canadian winter temperatures (ie below −30° C.) glass breakage is not a problem. This is because the plastic PVC material is sufficiently ductile that differential expansion within the plastic profile cross section can be accommodated. As well, the plastic framing profiles 21 are firmly adhered to the perimeter side faces of the glass sheets 26,27 as opposed to the bottom edge where glass breakage problems are accentuated due to glass edge micro cracks created during the glass cutting process.

At cold outside temperatures, a further concern is that there can be IG edge seal failure due to loss of adhesion between the glass sheets 26, 27 and an IG edge spacer. To eliminate this problem, there is a need for the perimeter edge seal to be somewhat flexible and for a conventional dual-seal design. One preferred option is use an inner desiccant-filled PIB/butyl spacer 62 that is backed by outer structural thermosetting sealant 63. Other IG dual-seal options include: flexible desiccant-filled silicone or EPDM rubber foam spacer (Trade name: Super Spacer) backed by hot melt butyl sealant.

Folding rubber spacer inserts 30 are used to accurately center the insulating glass panel unit 25 within the frame profile 21. These inserts 30 temporarily hold the framing members 21 on the panel unit 25 and also positions the panel 25 in the sash frame subassembly while it is transferred to the sealant gunning application station.

The bottom sides 64 and 65 of the U-channel frame profile are chamfered and this helps position the folding rubber spacer inserts 30 within the sash frame profile 21. To further help hold the folding rubber spacer inserts 30 in position, the sidewalls of the profile also incorporate inner ledges 66 and 67. The bottom section of the folding rubber spacer inserts 30 also incorporate a V-shaped opening that provides for water drainage from the glazing cavity 69.

To provide for consistent application, the sealant beads 54 and 55, are produced using robotic application equipment. One option is separately apply each bead using a standard robot and where the sash assembly frame is rotated through 180° degrees after the application of the first bead 54. A second option is to apply both beads 54 and 55, simultaneously using automated double-head sealant application equipment that operates in a similar manner to automated sealant gunning equipment used for insulating glass sealing. For double bead application, the sash frame assembly is typically in a vertical position and to ensure that the sealant material does not deform or drip particularly on the top edge, the thermoplastic sealant material needs to have a high viscosity.

Figure 6A:
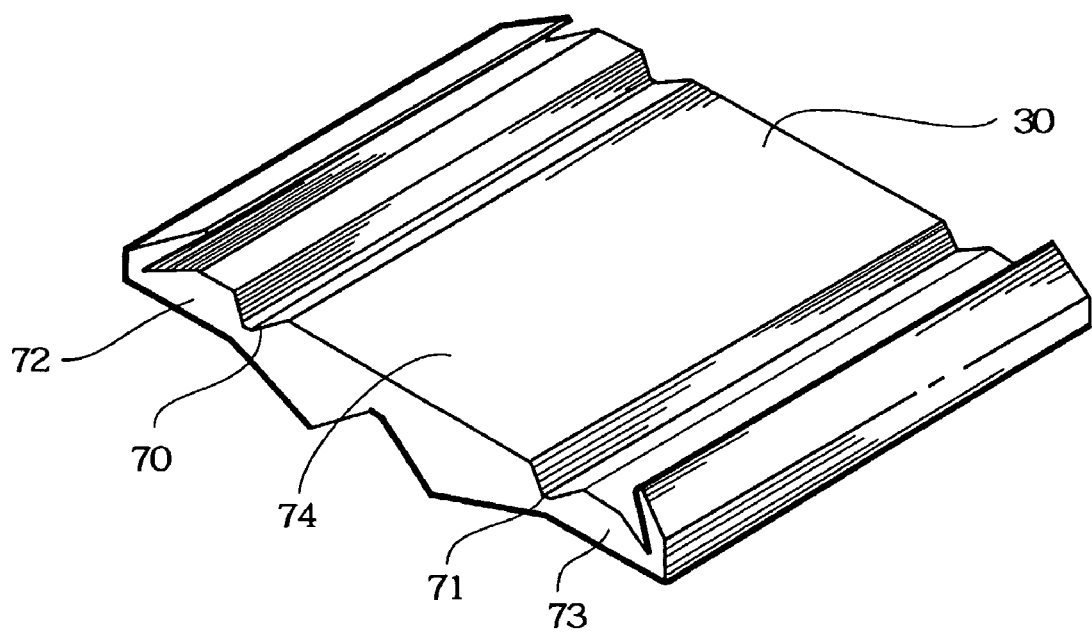
FIG. 6A is a perspective view of the folding rubber spacer inserts prior to insertion within the U-channel sash frame profile.

FIG. 6A shows a perspective view of the folding rubber spacer insert 30 prior to installation within the U-channel profile 21. The side wall sections 72 and 73 space the IG unit 25 away from the channel walls of the framing profile. The folding rubber spacer insert 30 incorporates V-notches 70 and 71, that allow the rubber spacer insert to be folded at the corners. The purpose of the V-notches 70 and 71, is to allow the inserts 30 to be easily installed within the frame profile 21 prior to the insertion of the IG panel 25. The V-notches 70 and 71 also help the folding rubber spacer insert 30 accommodate dimensional tolerances in the frame profile. The rubber inserts 30 can be made from a variety of different rubber materials with one preferred option being EPDM rubber.

Although a one piece assembly is shown in FIG. 6A, it can be appreciated by those skilled-in-the-art that the side wall sections could consist of two separate spacers that are individually attached to the side walls of the channel profile. Similarly the bottom section of the folding rubber spacer insert could also consist of a separate spacer that is positioned in the bottom channel of the framing profile.

Figure 6B:
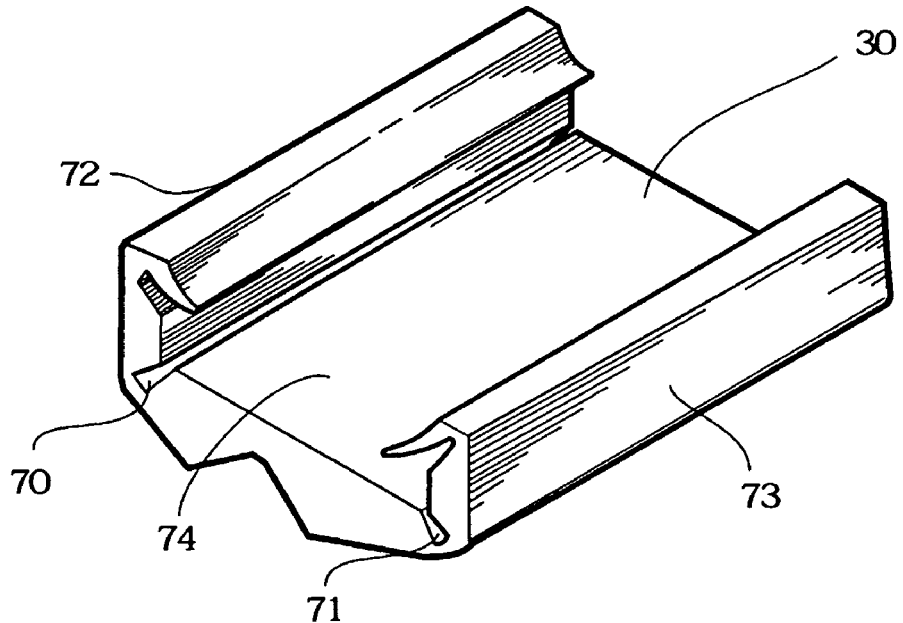
FIG. 6B is a perspective detail view of the folding rubber spacer inserts after insertion within the U-channel sash frame profile.

FIG. 6B shows a perspective view of the folding rubber spacer insert 30 with side sections 72 and 73 folded at right angles to the bottom section 74.

Figure 7A:
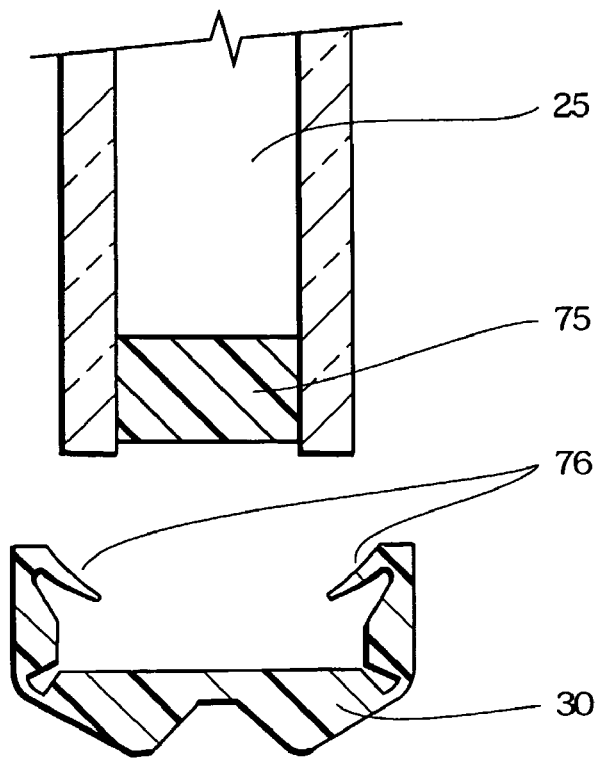
FIG. 7A shows a cross section detail of the folding rubber spacer and the perimeter edge of an insulating glass panel just prior to the insertion of the panel into the folding rubber spacer.

FIG. 7A shows an exploded cross section detail of the folding rubber spacer insert 30 and the perimeter edge 75 of an insulating glass unit panel 25 just prior to the insertion of the panel unit 25 into the folding spacer insert 30.

Figure 7B:
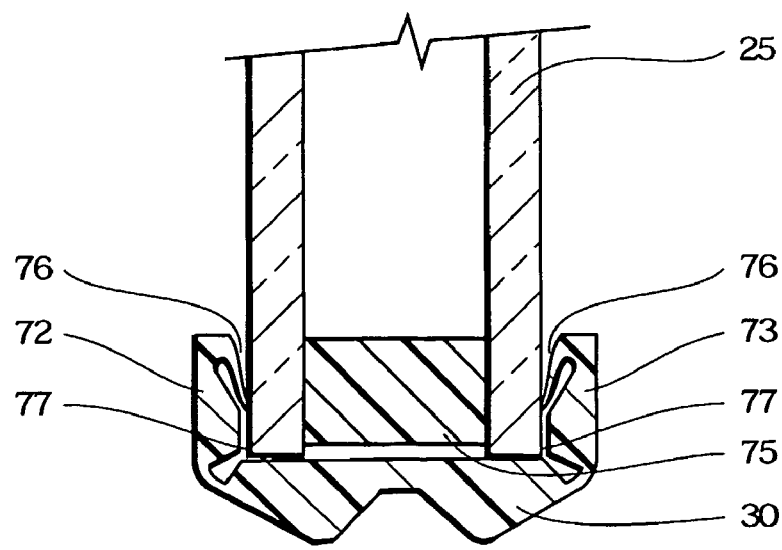
FIG. 7B is cross section detail of the perimeter edge of an insulating glass panel after the panel has been inserted into the folding rubber spacer.

FIG. 7B is a cross section detail of the perimeter edge 75 of an insulating glass panel 25 after the panel has been inserted into the folding rubber spacer insert 30 that is held within a U-channel frame profile (not shown). The side wall sections 72 and 73 of the folding rubber spacer insert 30 incorporate a protrusion or positioning flange 76 that extends beyond the inner wall surfaces 77 of the side walls 72 and 73. As the panel unit 25 is inserted into the folding rubber spacer 30, the protrusion 76 is compressed downwards and so as a result, the insulating glass panel 25 is firmly wedged in position and centered within the frame profile 21.

FIG. 8 shows the production steps involved in the fabrication of the integrated IG/sash frame assembly 20.

Figure 8A:
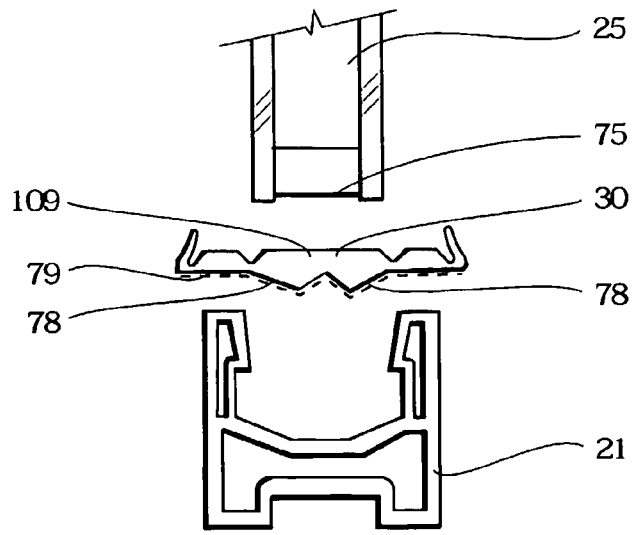
FIG. 8A shows an exploded cross section detail of three window sash frame components, including: (i) bottom perimeter edge of insulating glass panel, (ii) an unfolded rubber spacer insert and (iii) U-channel sash frame profile.

FIG. 8A shows an exploded bottom cross section detail of a window sash frame. There are only three components shown: an insulating glass panel 25, a folding rubber spacer insert 30 and a U-channel sash frame profile 21. The bottom faces 78 of the rubber spacer insert 30 are coated with a low-friction coating 79 (see dotted line). The low friction coating 79 allows the rubber spacer insert 30 to slide along the U-channel framing profile 21 during the friction corner welding process. The low friction coating 79 is compatible with standard IG sealant materials and one preferred material option is a polyurethane-based coating. In comparison, the top faces 109 of the rubber insert 30 preferably have a high friction coefficient and do not move in position during the friction corner welding process.

Figure 8B:
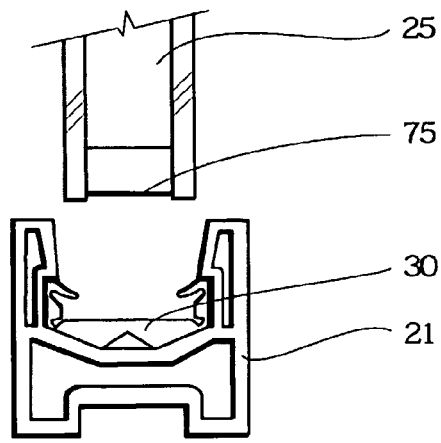
FIG. 8B shows a cross section detail of the folding rubber spacer inserted within the U-channel sash frame profile.

FIG. 8B shows an exploded bottom cross section detail of a window sash frame with the folding rubber spacer insert 30 inserted within the sash frame profile 21. The rubber spacer inserts 30 can be inserted manually or alternately, the spacer inserts 30 can be automatically inserted as part of the profile cutting and fabrication process.

Figure 8C:
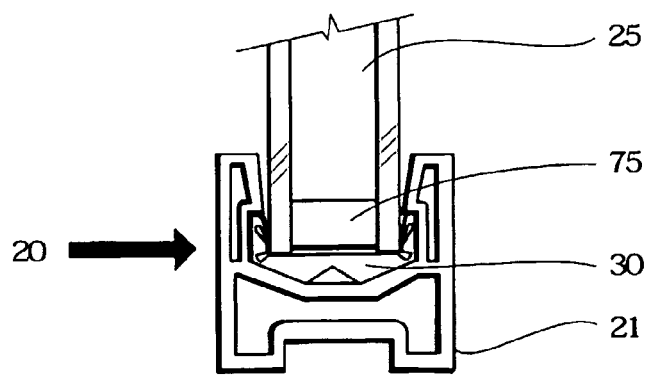
FIG. 8C shows the insulating glass panel inserted within the U-channel sash frame profile.

FIG. 8C shows a bottom cross section detail of a window sash frame 20 with the IG panel unit 25 installed within rubber spacer insert 30 that is held in position within the sash frame profile 21. The rubber spacer inserts 30 center the IG panel unit 25 in the sash frame 21 and the corners of the frame assembly are then welded using friction corner welding techniques that are described in PCT Application CA02/000842. As well as centering the panel unit 25, the rubber spacer inserts 30 also help isolate the IG unit 25 from any resonance or vibratory movement during the welding process. The sash frame assembly is then transported to the automated frame sealing robot (not shown) with the rubber spacer inserts 30 holding the IG unit 25 in position.

It should be noted that although the friction corner welding process is carried out with the IG panel unit 25 in either a horizontal or vertical position, the sealant gunning operation is typically carried out with the panel unit 25 in a vertical position. By positioning the IG panel unit 25 in a vertical position, this ensures that the IG panel unit 25 is centered within the frame profile 21 and that there is no compression of the bottom rubber side wall sections 72 and 73. After the double bead application of the reactive hot melt sealant, the sash frame assembly can be immediately transferred to the next step in the production process which is typically hardware application. As a result through these various improvements in assembly methods, there is a continuous sash frame production process with increased throughput and productivity and no major production bottlenecks or delays.

Although a double glazed panel unit is illustrated in FIG. 8, it can be appreciated by those skilled-in-the-art that a triple glazed unit could also be used. Alternatively using a different frame profile, the same production method can be used for welding around a single glass sheet and one option is for this single glass sheet would be as the center light of a triple glazed panel unit.

Figure 9:
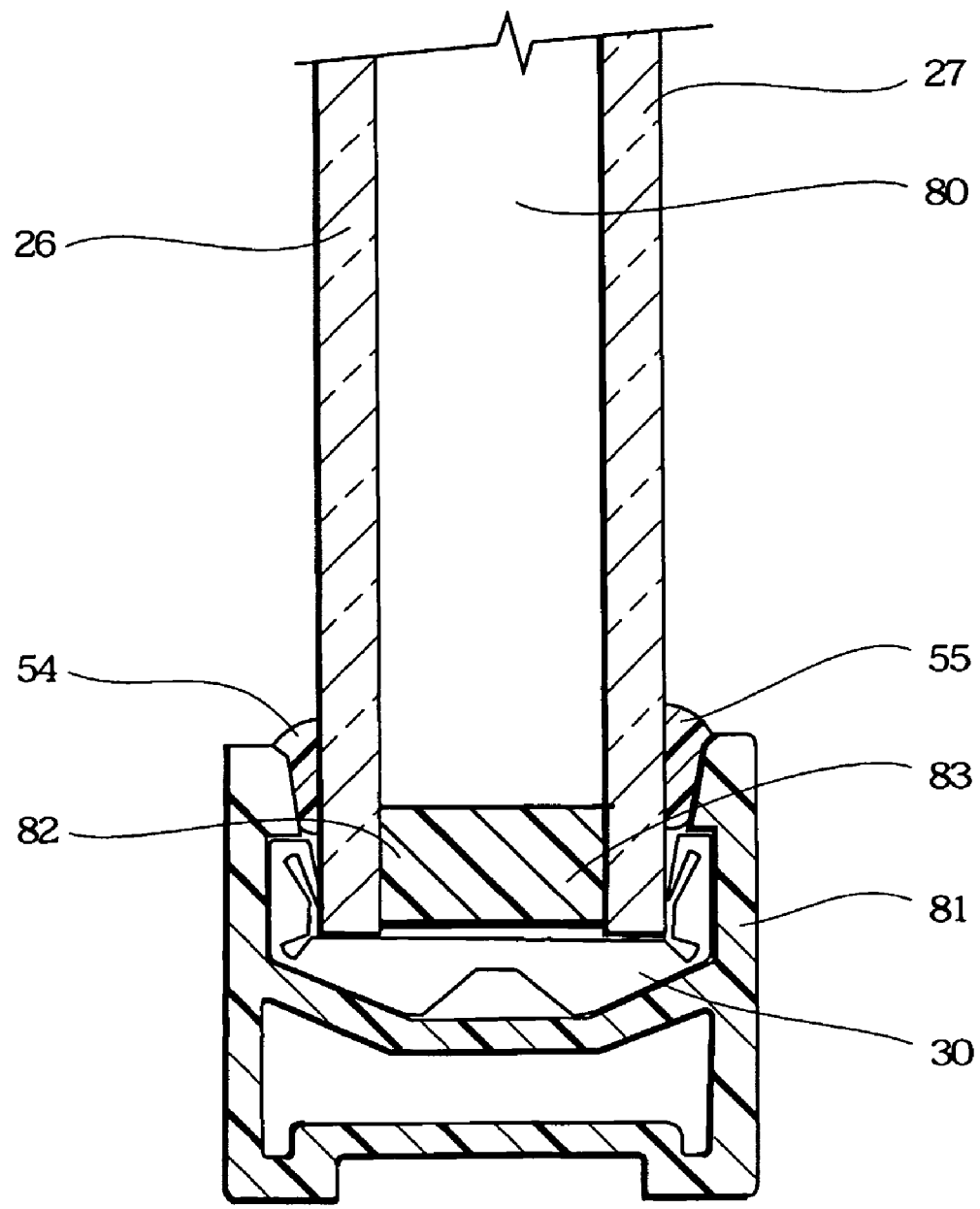
FIG. 9 shows a cross section detail of the perimeter edge of a single-seal insulating glass panel incorporated within a U-channel sash frame profile.

FIG. 9 shows a cross section bottom detail of a single seal IG panel unit 80 incorporated within a slim-line U-channel sash frame profile 81. In contrast to a dual seal IG unit, the perimeter edge seal assembly 82 consists of a single barrier seal. Various single seal assemblies can be used including: the Intercept™ edge seal product marketed by PPG Inc. and the Swiggle Seal™ product marketed by TruSeal Inc.

One preferred single seal design is to use a thermoplastic spacer 83 that is made from desiccant filled butyl and/or polyisobutylene sealant material. The thermoplastic spacer 83 is marketed under the trade name of TPS and is directly applied to the glass using automated sealant gunning equipment manufactured by Bystronic Inc. A key advantage of the TPS spacer is that the material remains somewhat flexible and as a result, the spacer/edge seal assembly can accommodate some degree of glass movement and bowing even at cold temperatures. Typically, the TPS spacer is backed up by a structural thermosetting sealant such as polysulphide or polyurethane sealant (See FIG. 5). However with integrated IG/sash frame assembly, the glass sheets 26 and 27, are structurally bonded to the frame profile 81 by means of structural sealant glazing beads 54, 55 and so as a result, there is no need for an outer structural IG sealant to hold the glass sheets 26 and 27 in position. By eliminating this outer structural sealant, there are material and equipment cost savings and as well, the frame profile size can also be reduced resulting in additional material cost savings. A further production benefit is that there are no delays while waiting for the thermosetting sealant to cure and this provides for continuous sash frame production with the resulting productivity improvements and cost savings.

FIG. 10 shows the key production steps for assembling U-channel sash frame profiles 21 around an insulating glass panel unit 25. FIG. 10A shows a schematic plan view of an insulating glass panel unit 25. FIG. 10B shows a schematic plan view of the insulating glass panel unit 25 with U-shaped plastic framing profiles 21 loosely assembled around the insulating glass panel unit 25. FIG. 10C shows a schematic plan view of the insulating glass unit/frame profile sub assembly 87 with corner junction pieces 22 inserted between the cut ends 23 and 24 of the framing profiles 21. The four corners of the sash frame subassembly 87 are then welded, using methods and techniques disclosed in PCT CA 02/000842 for example. FIG. 10D shows a schematic plan view of the completed sash frame window 20. As previously explained, the insulating glass panel unit 25 is held in position and centered in the U-shaped frame profile 21 using folding rubber spacer inserts (not shown).

Although the production process is shown in schematic form in FIG. 10, it can be appreciated by those skilled-in-the-art that the process can be fully automated using four headed production equipment as described in PCT Application CA02/000842. With a conventional, four headed hot plate welder, the overall cycle time is approximately 120 seconds and the time taken to manually load the four plastic profiles into the clamping fixtures is approximately 15 seconds. With four headed friction corner welder, the overall cycle time is less than 30 seconds but the task of manually loading the profiles takes 15 seconds while the actual weld time is less than 2 seconds.

Figure 10A:
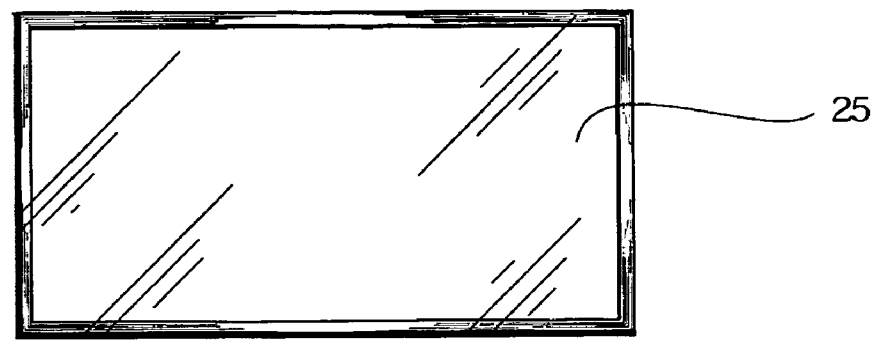
FIGS. 10A-10D show schematic plan views of the production process of an integrated IG/window frame assembly.
Figure 10B:
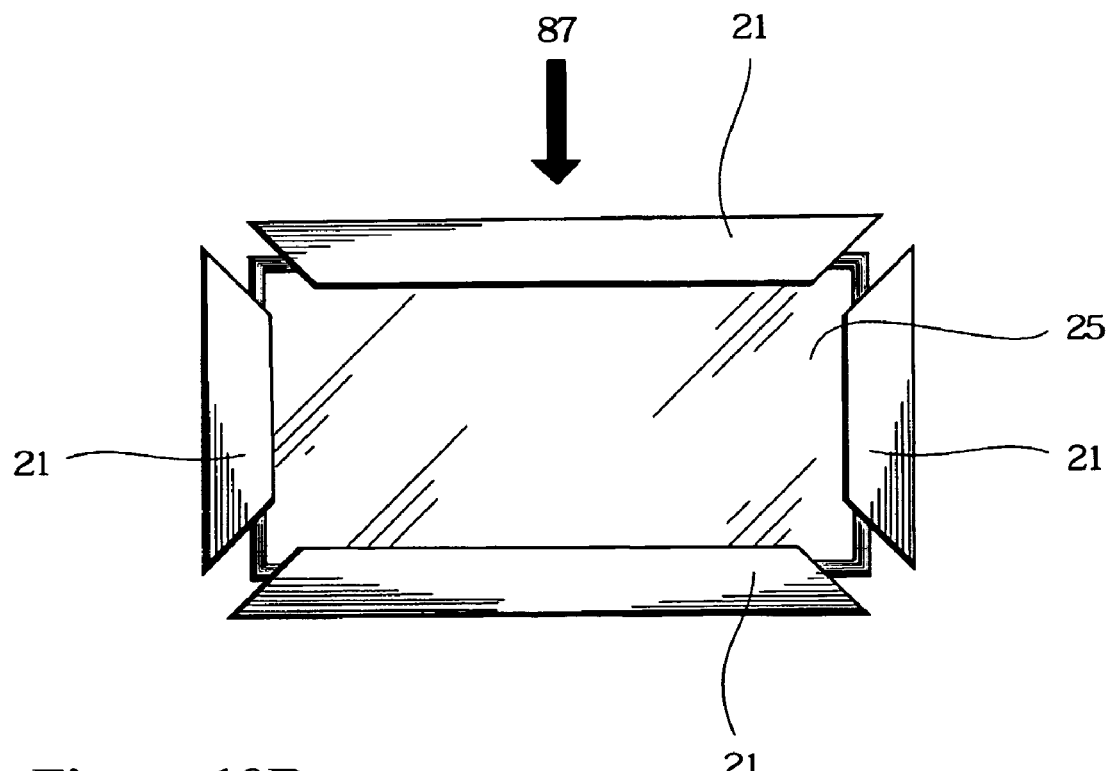
Figure 10C:
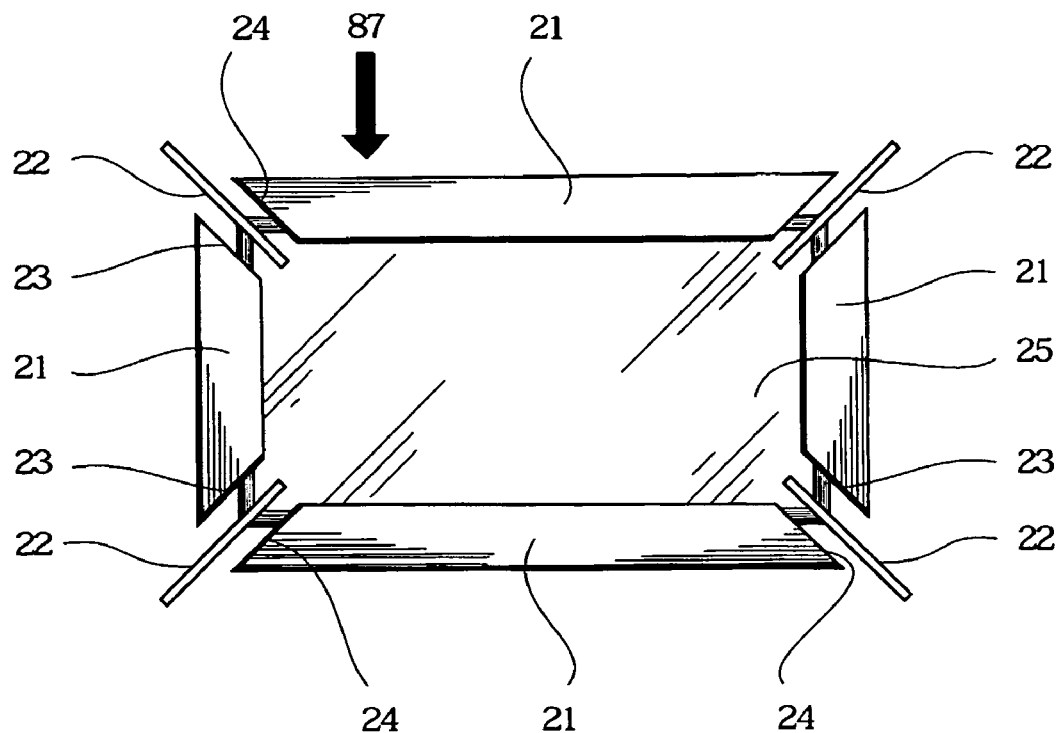
Figure 10D:
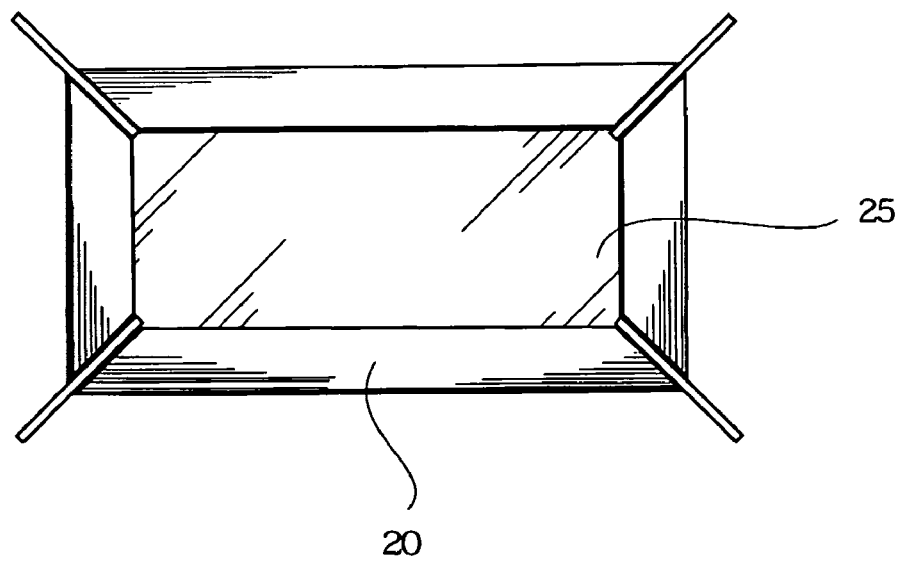

Instead of preloading the profiles into the clamping fixtures of the four headed welder, one option with friction corner welding is to loosely fit the profiles around the insulating glass unit (See FIG. 10B). The profiles 21 can be temporarily held in place, by the folding rubber spacer inserts 30 (not shown) allowing the sub assembly of IG unit/frame profiles 87 to be transferred to the four-headed welder. The planar flange junction pieces 22 are then inserted and the corners welded using friction corner welding techniques. (See FIG. 10C). As a result of pre-assembling the frame profiles 21 around the IG panel unit 25, the overall cycle time can potentially be reduced to less than fifteen seconds.

Finally, it should be noted that in FIG. 10 although schematic plan views are shown with the insulating glass panel unit 25 in a horizontal position, the various manufacturing operations can also be carried out with the insulating glass panel unit 25 in a vertical position.

Where a thermoplastic sealant spacer is used, the sealant is preferably applied directly onto the perimeter glass edge with the glass sheet in a vertical position. As previously noted, the double bead sealant gunning operation is also carried out with the IG/frame sub assembly in a vertical position and so if all the various assembly operations are consistently carried out with the glass sub assemblies in a vertical position, there are potential productivity improvements and cost savings.

Figure 11A:
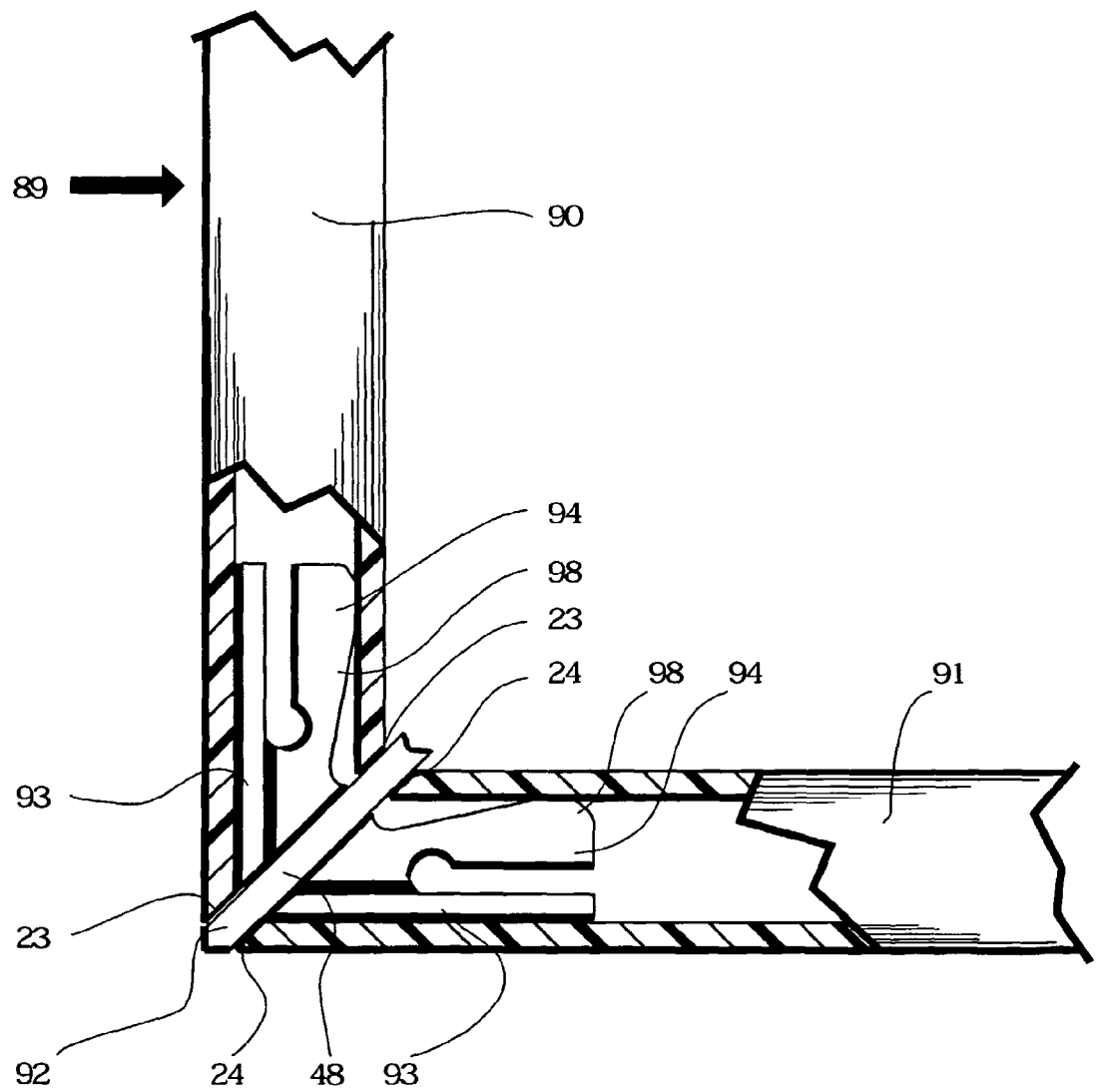
FIG. 11A is a cross section plan view detail of a frame corner assembly where the thermoplastic plastic profiles are vibration welded at the corner using a corner junction piece with a diagonal web and integral legs.
Figure 11B:
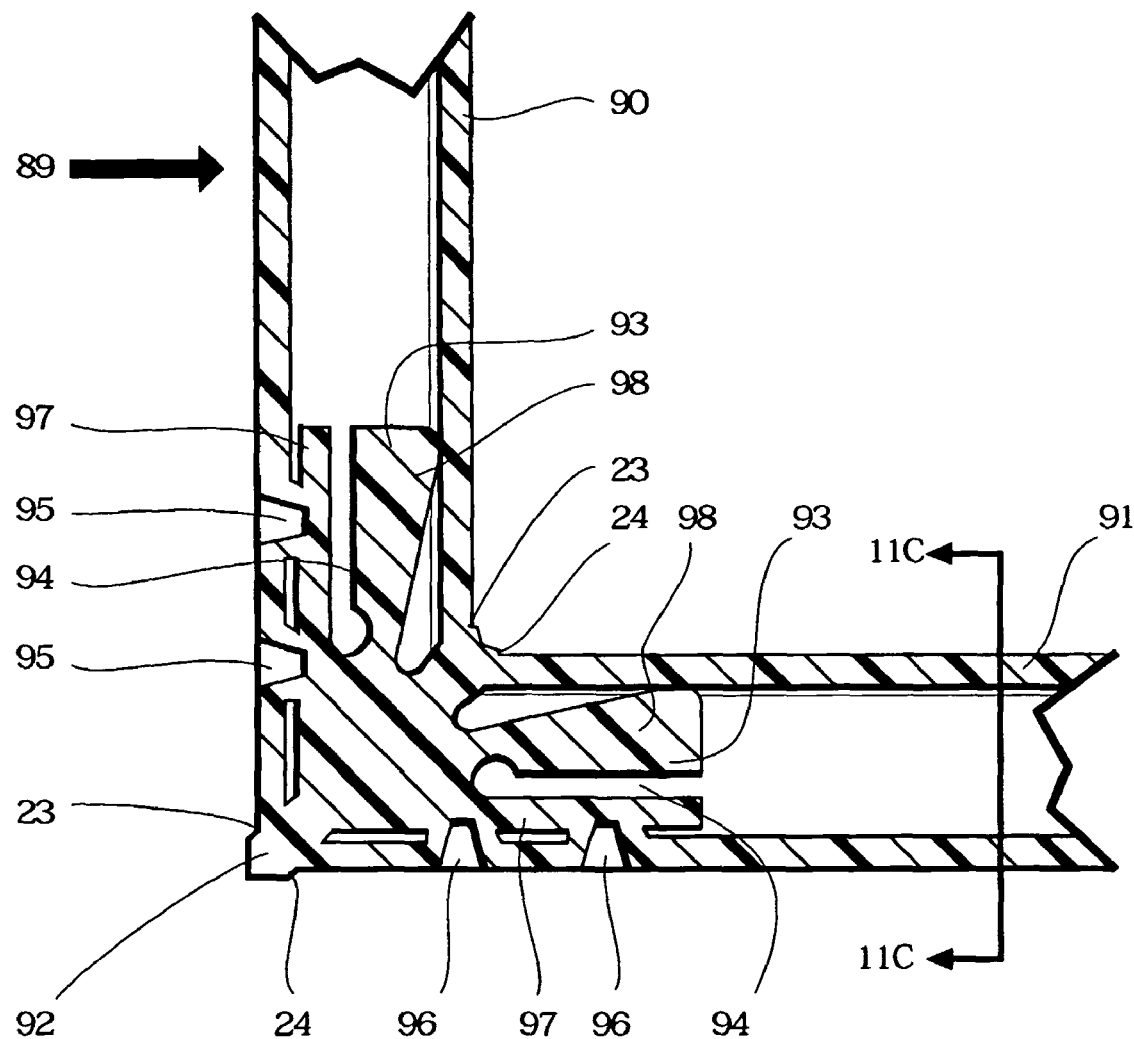
FIG. 11B is a cross section detail of the frame corner assembly as shown in FIG. 11A where the plastic framing profile is ultrasonically spot welded to the integral legs of the corner junction piece.

FIGS. 11A and 11B show a cut out cross section plan view of a corner frame assembly 89 fabricated from square profile glass fiber filled PVC profile extrusions 90 and 91 and where the profiles 90 and 91 are vibration corner welded at using a junction piece 92 incorporating integral legs 93.

As shown in FIG. 11A, the integral legs 93 of the junction piece 92 incorporate an integral spring centering device 94 that simplifies frame assembly. The planar flange 48 of the junction piece 92 is first vibration welded to the miter cut ends 23 and 24 of the profiles 90 and 91. Because of the need to accommodate the vibration movement back and forth, the legs 93 only loosely fit within the profile.

As shown in FIG. 11B, in order to provide for additional support, the plastic framing profiles 90 and 91 are ultrasonically spot welded to the legs 93 of the junction piece 92. A double tip welding head is typically used creating spot welds 95 and 96. Because the legs 93 only loosely fit within the profile, the ultrasonic welding process allows the plastic to flow in the gap between the junction piece legs 93 and the profile extrusions 90 and 91 creating an extra strong welded spot bond and reduced material flow on the exterior surface. Because of their complex shape, the junction pieces 92 are typically injection molded and have to be manufactured from essentially the same base thermoplastic resin material as the extruded profiles 90 and 91.

Figure 11C:
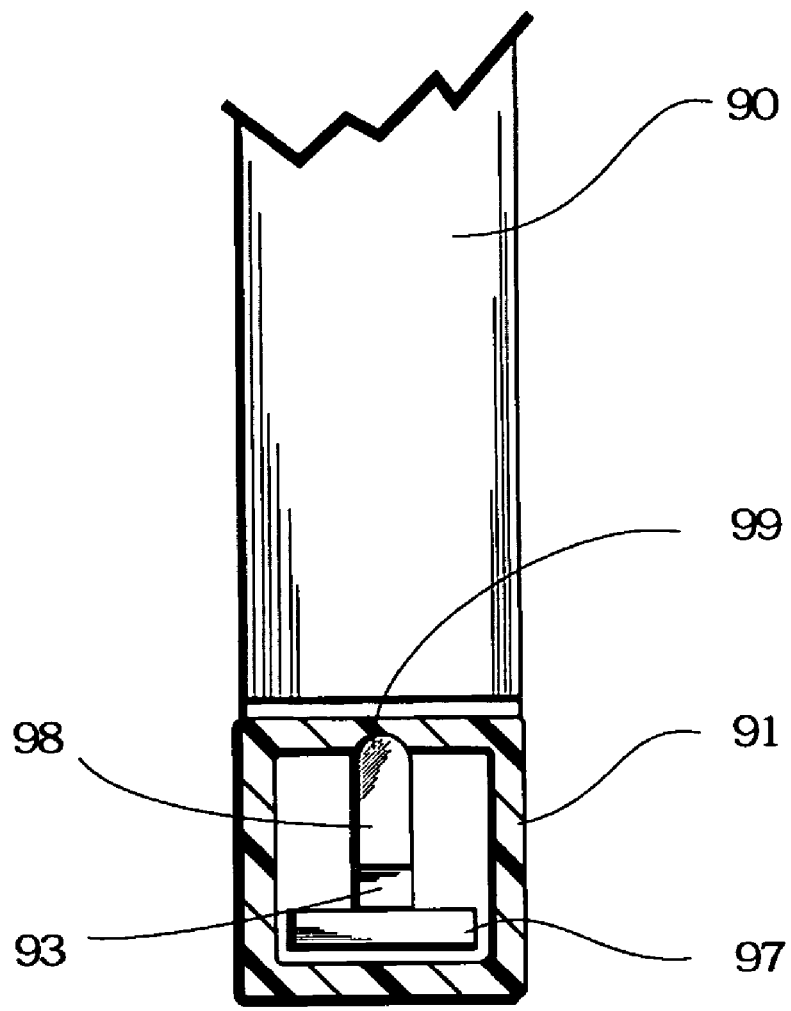
FIG. 11C shows a vertical cross-section detail through the hollow profile shown in FIG. 11A.
Figure 12A:
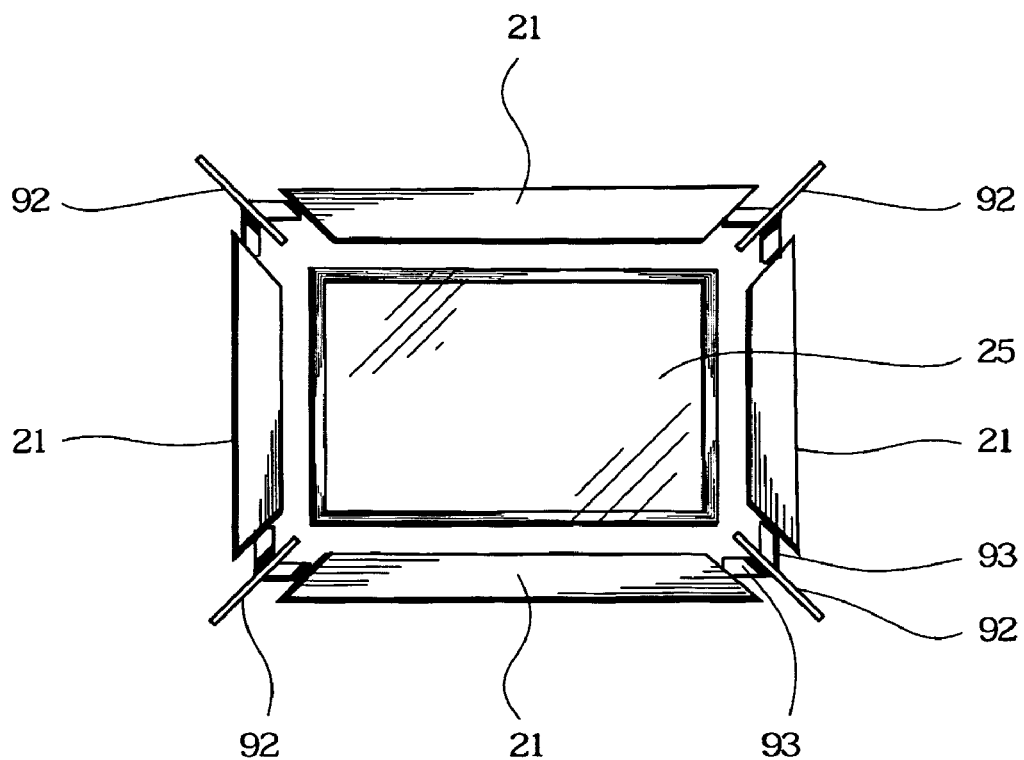
FIGS. 12A-12E show schematic plan views of a high volume production process of an integrated IG/frame assembly.
Figure 12B:
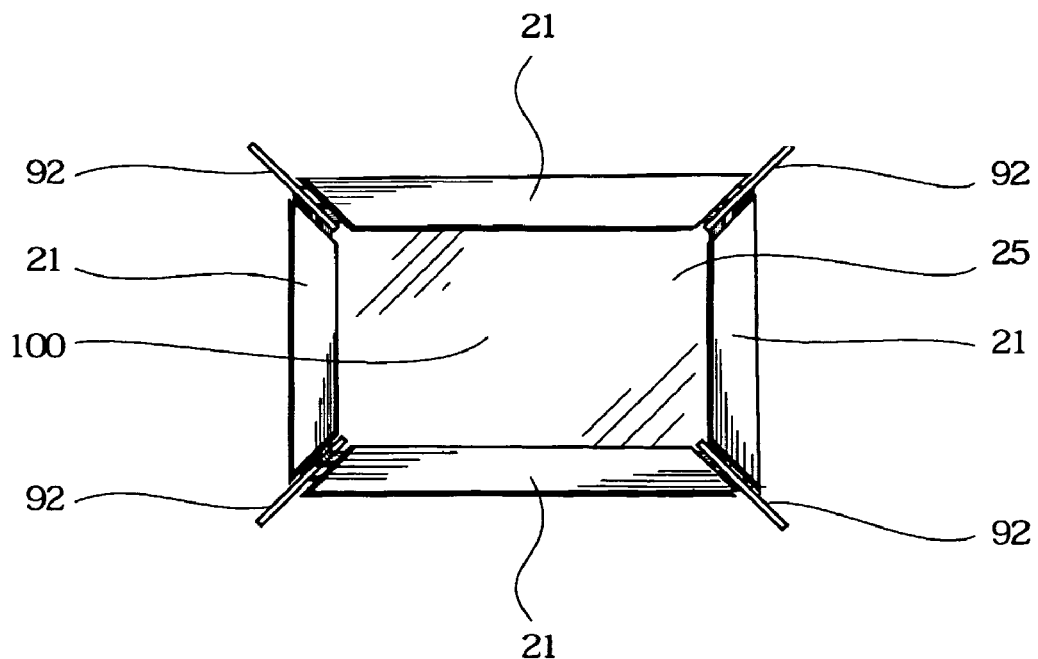
Figure 12C:
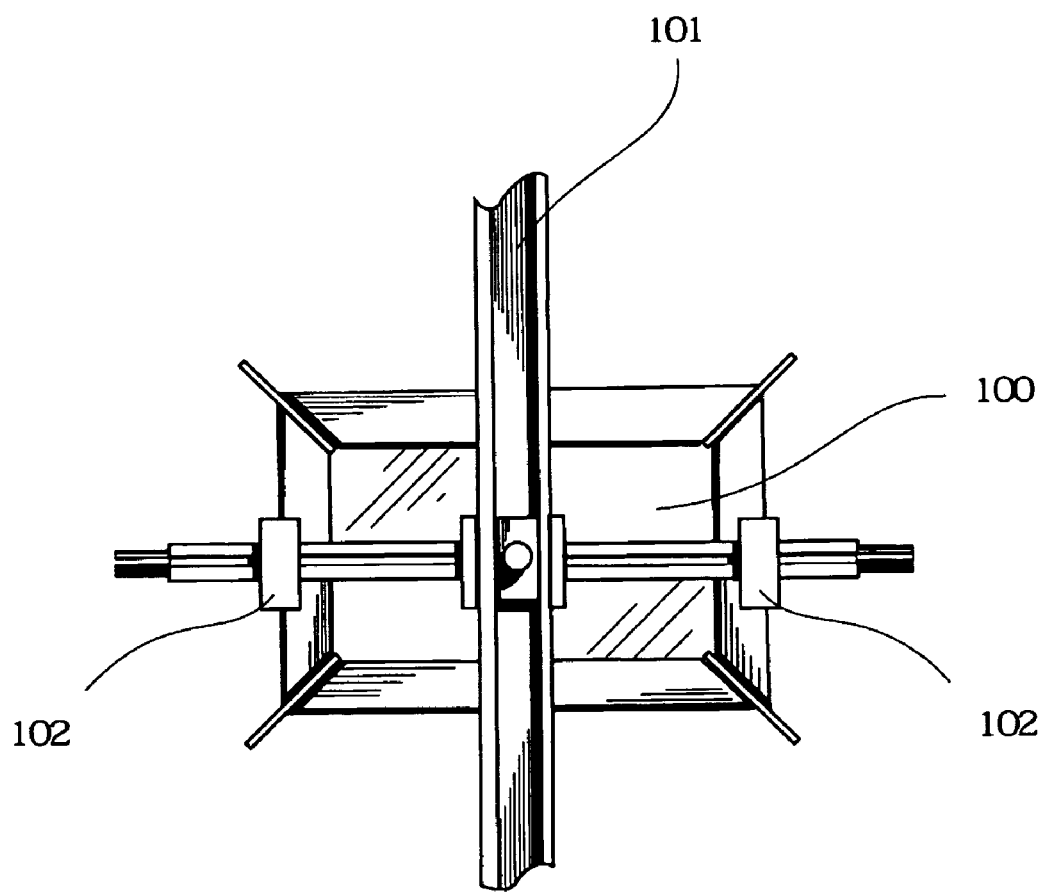
Figure 12D:
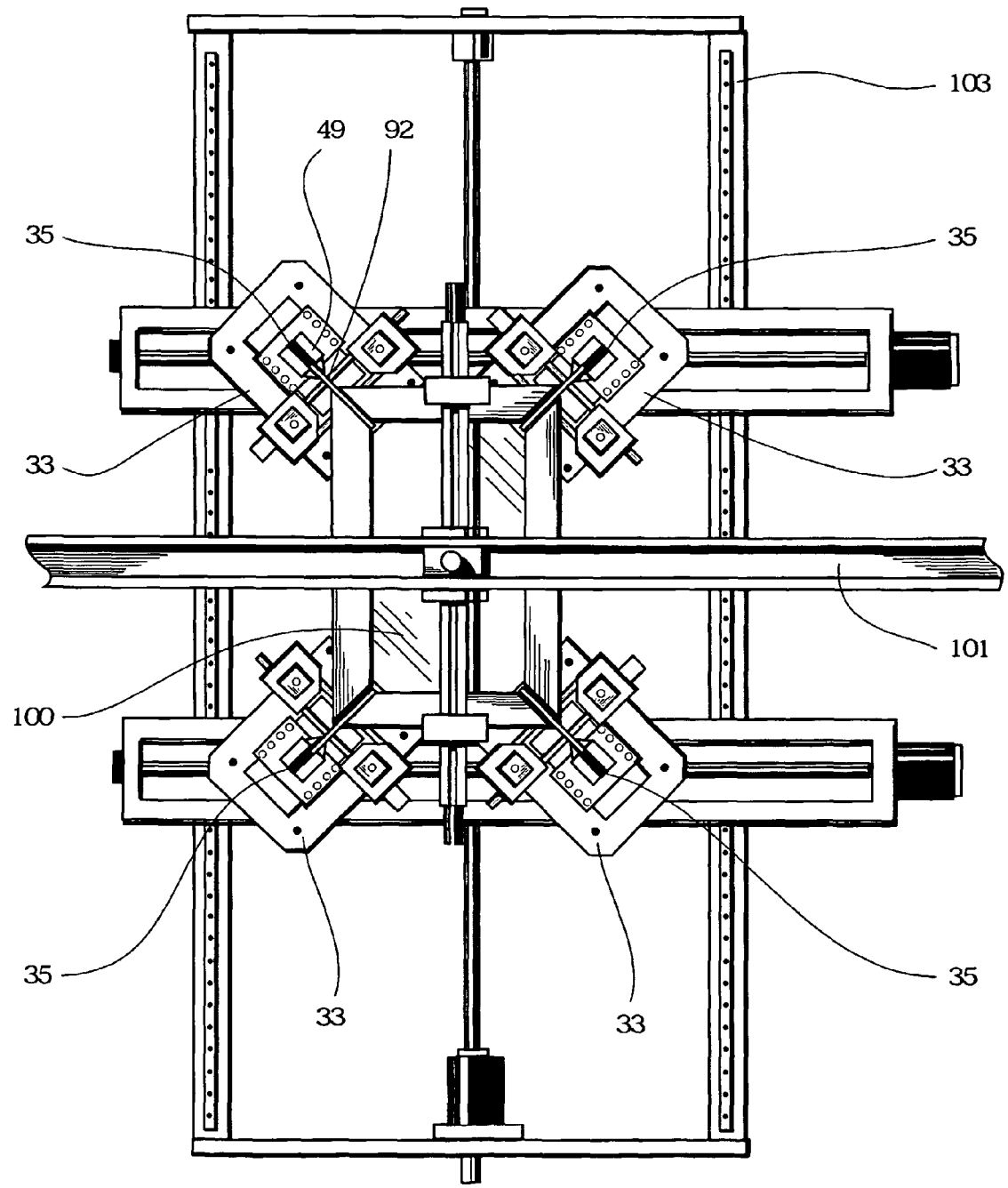
Figure 12E:
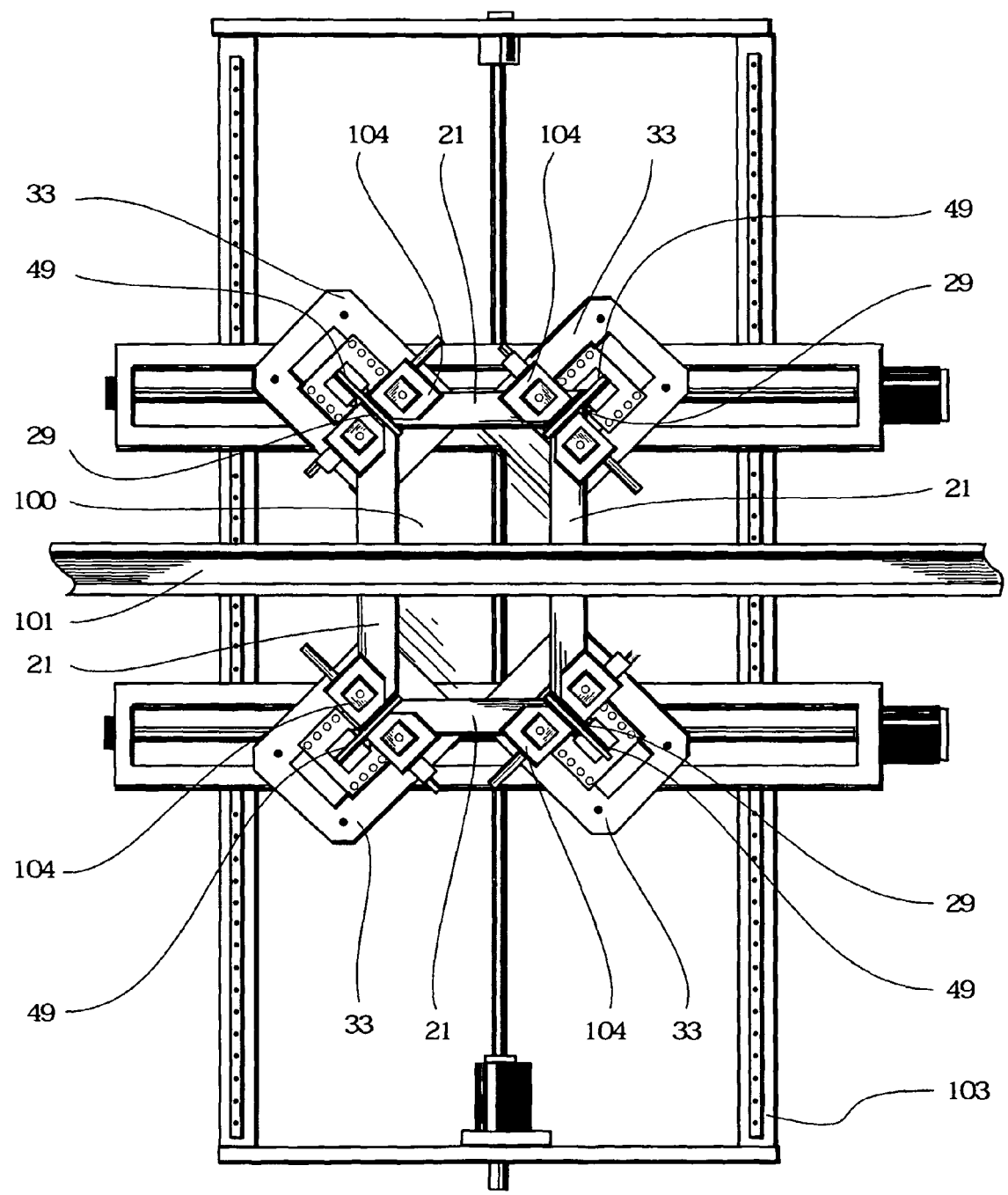

FIG. 11C shows a vertical cross section through the hollow framing profile 91. The integral legs 93 of the junction piece 92 consist of a rigid flat bar 97 with a central positioning fin 98. The profile extrusion incorporates a half circular indentation 99 and this allows the positioning fin 98 to be centrally located.

FIG. 12 shows an alternative high volume production process for welding around an insulating glazing panel unit 25. FIG. 12A shows a plan view of an insulating glazing panel unit 25 with U-Channel framing profiles 21 manually assembled around an insulating glazing panel unit 25 and where the profiles 21 are loosely interconnected by junction pieces 92 that incorporate integral legs 93. FIG. 12B shows a plan view of the insulating glass/frame subassembly 100 where the profiles 21 are positioned around the insulating glass panel unit 25 and where the profiles are in part held in position by folding rubber spacer inserts (not shown). FIG. 12C shows a plan view of the insulating glass/frame subassembly 100 suspended below a gantry 101 and held in position by means of an adjustable clamping mechanisms 102. FIG. 12D shows a plan view of four headed horizontal friction corner welder 103 where the insulating glass/frame subassembly 100 is transferred by the gantry 101 and dropped into position in the friction corner welder 103. The removeable tabs 49 of the junction pieces 92 are located in the junction piece holding fixture 35 that are attached to the vibratory heads 33. FIG. 12E shows a plan view of the insulating glass/frame subassembly 100 where the frame profiles 21 are clamped in position in moveable framing fixtures 104 and where the subassembly 100 is squared prior to friction corner welding the four corners 29. After the welding process, the removable tabs 49 are automatically cut-off and the framing fixture clamps 104 are released. The assembled sash frame window 20 is then moved by the gantry 101 to the next window production operation.

Because with this high volume production process, the framing profiles are not manually placed in the profile fixtures, weld cycle time is substantially reduced to less than fifteen seconds per window unit and this results in a production output of two thousand windows per eight hour shift. It should be noted that although a high volume sash frame production method is described in FIG. 12, it can be appreciated by those skilled-in-the-art that the same production methods and apparatus can also be used to manufacture separate window frame assemblies.

Figure 13:
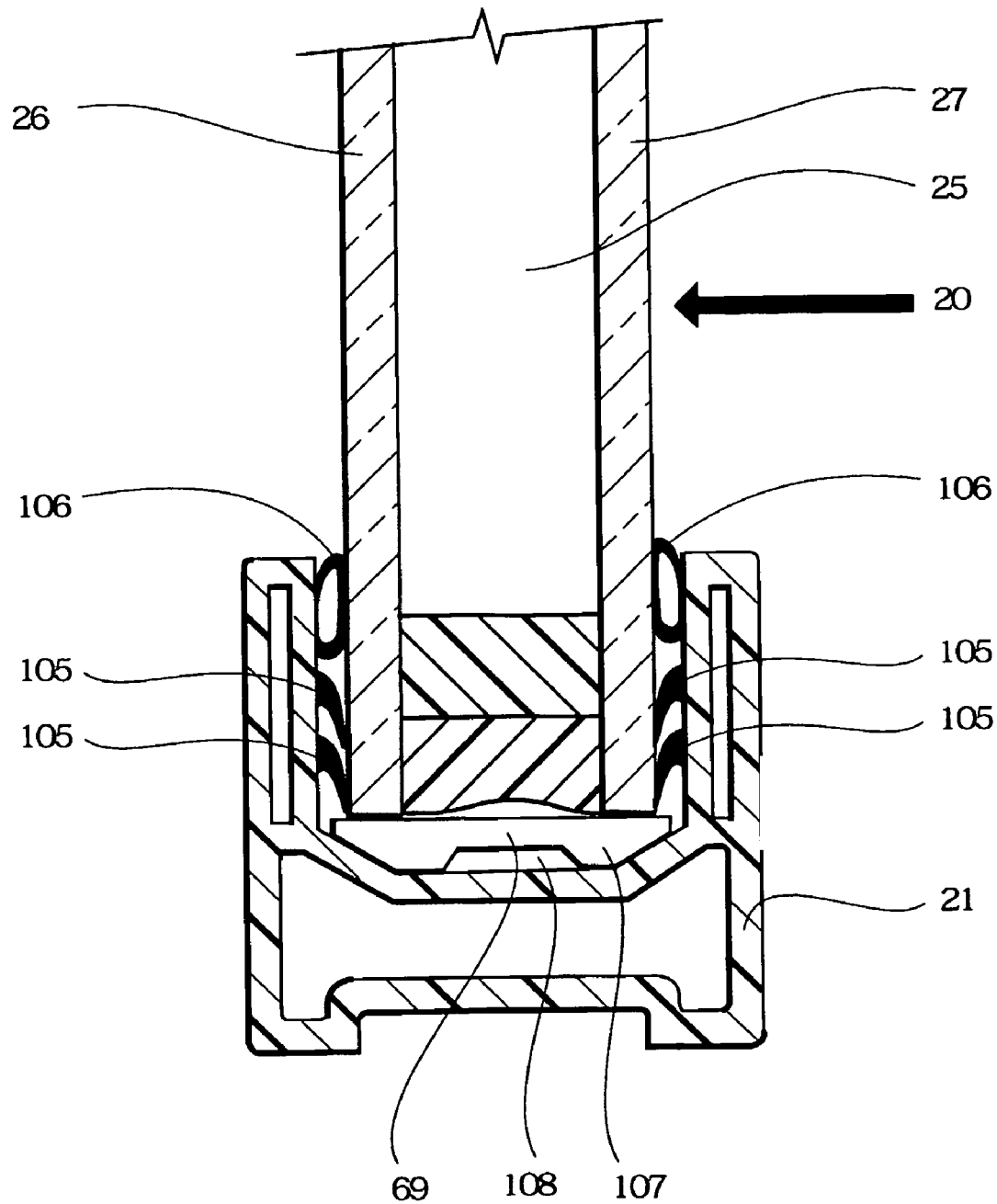
FIG. 13 is a vertical cross section of a U-channel sash frame window incorporating a double glazed insulating panel and thermoplastic U-channel framing profiles with integrally formed flexible fin spacers and glazing bulb seals.

FIG. 13 shows a bottom cross-section detail of a U-channel sash window profile 21 featuring flexible fin spacers 105 and glazing-bulb seal 106. U-shaped channel profiles 21 are assembled around the insulating glass panel unit 25. The panel unit 25 is then inserted into the channel frame profile 21. The double set of flexible fin spacers 105 that are integrally formed with the framing profile 21 are compressed downwards and hold the insulating glass unit 25 in position. Typically, the flexible fins 105 are made from flexible PVC plastic material and are extruded simultaneously with the PVC framing profiles.

The dual seal insulating glass panel unit 25 is supported on a rubber support pad 107 that is positioned centrally in the U-shaped framing profile 21. The support pad 107 incorporates an opening 108 to allow for water drainage from the glazing cavity 69. The flexible glazing bulb seal 106 that is also integrally formed with the framing profile 21 prevents rain water run-off from entering the glazing cavity 39. The use of integrally formed flexible fin spacers and bulb seals does not provide for the same structural performance as the twin sealant bead assembly previously described in FIG. 5. However for smaller residential windows the use of integrally formed spacers provides for adequate structural performance and with the added advantage of lower equipment, material and labor costs.

The invention claimed is:

1. A framed panel unit comprising:
 a panel; and
 a plurality of thermoplastic frame members disposed along the edge of said panel;
 each frame member having first and second opposed side walls defining a channel therebetween, the edge of said panel being received within the channel of each frame member;
 the channel of each frame member having spacer means therein including a first spacer between said panel and said first side wall for spacing said panel from said first side wall and a second spacer between said panel and said second side wall for spacing said panel from said second side wall and where prior to welding together the ends of said frame members, said spacer means positions said panel within said channel and further retains said frame members on said panel,
 wherein said channel of each frame member includes a base between the first and second opposed sidewalls, wherein each spacer means further comprises a third spacer arranged between the edge of said panel and the base of said channel and wherein said first and second spacers are coupled to said third spacer,
 wherein said third spacer includes means for permitting fluid to flow therethrough between adjacent portions of said channel separated by said third spacer.

2. A framed panel unit as claimed in claim 1, wherein at least one of said first and second spacers includes a protrusion extending therefrom and engaging a respective side of said panel for resiliently retaining said frame member on said panel.

3. A framed panel unit as claimed in claim 1, wherein said panel is comprising at least part of sheet glass.

4. A framed panel unit as claimed in claim 1, wherein at least one of said first and second spacers is positioned below the top of a respective channel wall to provide an open gap at the top of said side wall for receiving sealant.

5. A framed panel unit as claimed in claim 4, wherein said sealant comprises a reactive thermoplastic sealant material.

6. A framed panel unit as claimed in claim 4, wherein said sealant is one of polyurethane based and silicone based.

7. A framed panel unit as claimed in claim 1, wherein at least one of said first and second spacers is integrally formed with a respective channel wall.

8. A framed panel unit as claimed in claim 1, wherein each said frame member further includes a series of pre-formed inserts between one of said first and second opposed side walls and an outer face of said panel for spacing said outer face of said panel from said side wall to define a gap therebetween for sealant material.

9. A framed panel unit as claimed in claim 8, wherein said inserts comprise a resilient rubber material and said framed panel unit includes friction reducing means between said inserts and said channel to facilitate relative movement between said inserts and each said frame member.

10. A framed panel unit as claimed in claim 7, wherein each of said at least one of said first and second spacers includes one or more protrusions integrally formed with and extending from the other side wall, and wherein said integrally formed protrusions comprise flexible plastic fins.

11. A framed panel unit as claimed in claim 10, wherein said integrally formed protrusions further comprise a flexible bulb seal located at the top of one of said side walls.

12. A framed panel unit as claimed in claim 1, wherein said spacer means centers said panel within said channel.

13. A framed panel unit comprising:
 a panel; and
 a plurality of thermoplastic frame members disposed along the edge of said panel;

each frame member having first and second opposed side walls defining a channel therebetween, the edge of said panel being received within the channel of each frame member;

the channel of each frame member having spacer means therein including a first spacer between said panel and said first side wall for spacing said panel from said first side wall and a second spacer between said panel and said second side wall for spacing said panel from said second side wall and where prior to welding together the ends of said frame members, said spacer means positions said panel within said channel and further retains said frame members on said panel, wherein said channel of each frame member includes a base between the first and second opposed sidewalls, wherein each spacer means further comprises a third spacer arranged between the edge of said panel and the base of said channel and wherein said first and second spacers are coupled to said third spacer, wherein for each spacer means, the first and second spacers are hingedly coupled to said third spacer and the respective junction between each of said first and second spacers and said third spacer is relieved to accommodate folding of said first and second spacers towards said third spacer.

14. A framed panel unit comprising:

a panel; and a plurality of thermoplastic frame members disposed along the edge of said panel;

each frame member having first and second opposed side walls defining a channel therebetween, the edge of said panel being received within the channel of each frame member;

the channel of each frame member having spacer means therein including a first spacer between said panel and said first side wall for spacing said panel from said first side wall and a second spacer between said panel and said second side wall for spacing said panel from said second side wall and where prior to welding together the ends of said frame members, said spacer means positions said panel within said channel and further retains said frame members on said panel, wherein said channel of each frame member includes a base between the first and second opposed sidewalls, wherein each spacer means further comprises a third spacer arranged between the edge of said panel and the base of said channel and wherein said first and second spacers are coupled to said third spacer, wherein said third spacer includes locator means for positioning said third spacer at a predetermined lateral position between the side walls of said channel and wherein the base of said channel has first and second oppositely sloped upper surfaces which slope transversely of said channel and said locator means includes first and second oppositely sloped lower surfaces of said third spacer which engage the sloped surfaces of said channel such that said third spacer is urged towards a central position within said channel on applying a force to said third spacer towards the base of said channel.

* * * * *